(12) United States Patent
Walzer, Jr. et al.

(10) Patent No.: US 9,879,104 B2
(45) Date of Patent: Jan. 30, 2018

(54) PROCESS TO PRODUCE ETHYLENE CONJUGATED DIENE COPOLYMERS AND COPOLYMERS THEREFROM

(71) Applicant: ExxonMobil Chemical Patents Inc., Baytown, TX (US)

(72) Inventors: John F. Walzer, Jr., Seabrook, TX (US); Anna A. Michels, Houston, TX (US); John R. Hagadorn, Houston, TX (US); Sarah J. Mattler, League City, TX (US); Carlos R. Lopez-Barron, Houston, TX (US); Anthony J. Dias, Houston, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 0 days.

(21) Appl. No.: 15/083,479

(22) Filed: Mar. 29, 2016

(65) Prior Publication Data

US 2016/0319057 A1 Nov. 3, 2016

Related U.S. Application Data

(60) Provisional application No. 62/153,749, filed on Apr. 28, 2015.

(51) Int. Cl.
*C08F 210/02* (2006.01)
(52) U.S. Cl.
CPC .................. *C08F 210/02* (2013.01)
(58) Field of Classification Search
CPC .................................................. C08F 210/02
See application file for complete search history.

(56) References Cited

U.S. PATENT DOCUMENTS

| | | | |
|---|---|---|---|
| 6,175,409 B1 | 1/2001 | Nielsen et al. | |
| 6,260,407 B1 | 7/2001 | Petro et al. | |
| 6,288,191 B1 | 9/2001 | Nishiyama et al. | |
| 6,294,388 B1 | 9/2001 | Petro | |
| 6,306,658 B1 | 10/2001 | Turner et al. | |
| 6,309,997 B1 * | 10/2001 | Fujita | C07F 7/006 502/103 |
| 6,406,632 B1 | 6/2002 | Safir et al. | |

(Continued)

FOREIGN PATENT DOCUMENTS

| | | |
|---|---|---|
| JP | B-48-56775 | 8/1973 |
| WO | WO 2000/09255 | 2/2000 |

(Continued)

OTHER PUBLICATIONS

Bonnet, F. et al., "Copolymerization of Isoprene with Nonconjugated α,ω—Dienes Using a Single Component Samarocene Catalyst," Macromolecules, 2002, vol. 35, pp. 1143-1145.

(Continued)

*Primary Examiner* — Catherine S Branch

(57) ABSTRACT

This invention relates to a process to using an aminopyridinate scandium or yttrium metal (typically scandium) catalyst compound to produce ethylene conjugated diene copolymers, preferably ethylene isoprene copolymers having: 1) from 75 to 90 mol % ethylene; 2) from 10 to 25 mol % isoprene; 3) a Tg of 0° C. or less; 4) 1,4 isomer present at 60 wt % or less; 5) 3,4 and 1,2 present at 40% or more; 6) Mn of 250,000 g/mol or less; and 7) optionally, a Tm of 100° C. or less.

23 Claims, 1 Drawing Sheet

DMTA Data for Example 24

(56) References Cited

U.S. PATENT DOCUMENTS

| | | |
|---|---|---|
| 6,436,292 B1 | 8/2002 | Petro |
| 6,454,947 B1 | 9/2002 | Safir et al. |
| 6,455,316 B1 | 9/2002 | Turner et al. |
| 6,461,515 B1 | 10/2002 | Safir et al. |
| 6,475,391 B2 | 11/2002 | Safir et al. |
| 6,489,168 B1 | 12/2002 | Wang et al. |
| 6,491,816 B2 | 12/2002 | Petro |
| 6,491,823 B1 | 12/2002 | Safir et al. |
| 2009/0253875 A1 | 10/2009 | Senda et al. |
| 2013/0197174 A1 | 8/2013 | Kaita et al. |
| 2014/0005327 A1 | 1/2014 | Horikawa et al. |
| 2014/0018493 A1 | 1/2014 | Horikawa et al. |
| 2014/0031502 A1 | 1/2014 | Qin et al. |
| 2014/0031503 A1 | 1/2014 | Qin et al. |

FOREIGN PATENT DOCUMENTS

| | | |
|---|---|---|
| WO | WO2014/052957 | 4/2014 |
| WO | WO 2014/055868 | 4/2014 |

OTHER PUBLICATIONS

Boussie, T.R., et al., "*A Fully Integrated High-Throughput Screening Methodology for the Discovery of New Polyolefin Catalysts: Discovery of a New Class of High Temperature Single-Site Group (IV) Copolymerization Catalysts*," Journal of the American Chemical Society, 2003, vol. 125, pp. 4306-4317.

Capacchione, C. et al., "*Copolymerization of Ethylene with Isoprene Promoted by Titanium Complexes Containing a Tetradentate [OSSO]-Type Bis(phenolato) Ligand*," Journal of Polymer Science: Part A: Polymer Chemistry, 2010, vol. 48, pp. 4200-4206.

Doring, C. et al., "*Aminopyridinate-Stabilized Lanthanoid Complexes: Synthesis, Structure, and Polymerization of Ethylene and Isoprene*," European Journal of Inorganic Chemistry, 2010, vol. 18, pp. 2853-2860.

Huang, W. et al., "*Synthesis, characterization, and the ethylene (co-)polymerization behaviour of half-titanocene dicholoride 2-aryliminoquinolin-8-olates*," Catalysis Science & Technology, 2012, vol. 2, pp. 2090-2098.

Lee, D. et al., "*Copolymerizations of olefins and dienes with homogeneous and heterogeneous catalysts*," Eur. Polym. J., 1997, vol. 33(4), pp. 447-451.

Li, X. et al., "*Alternating and Random Copolymerization of Isoprene and Ethylene Catalyzed by Cationic Half-Sandwich Scandium Alkyls*," Journal of the American Chemical Society, 2009, vol. 131, pp. 13870-13882.

Rodrigues, A. et al., "*Stereocontrolled styrene-isoprene copolymerization and styrene-ethylene-isoprene terpolymerization with a single-component allyl ansa-neodymocene catalyst*," Polymer, 2008, vol. 49, pp. 2039-2045.

Visseaux, M. et al., "*New Viscoelastic Materials Obtained by Insertion of an α-Olefin in a trans-Polyisoprene Chain with a Single-Component Organolanthanide Catalyst*," Macromolecular Chemistry and Physics, 2001, vol. 202(12), pp. 2485-2488.

Kretschmer, W.P. et al., "*Reversible Chain Transfer Between Organoyttrium Cations and Aluminum: Synthesis of Aluminum Terminated Polyethylene with Extremely Narrow Molecular Weight Distribution*," Chemistry—A European Journal, 2006, vol. 12, No. 35, pp. 8969-8978.

* cited by examiner

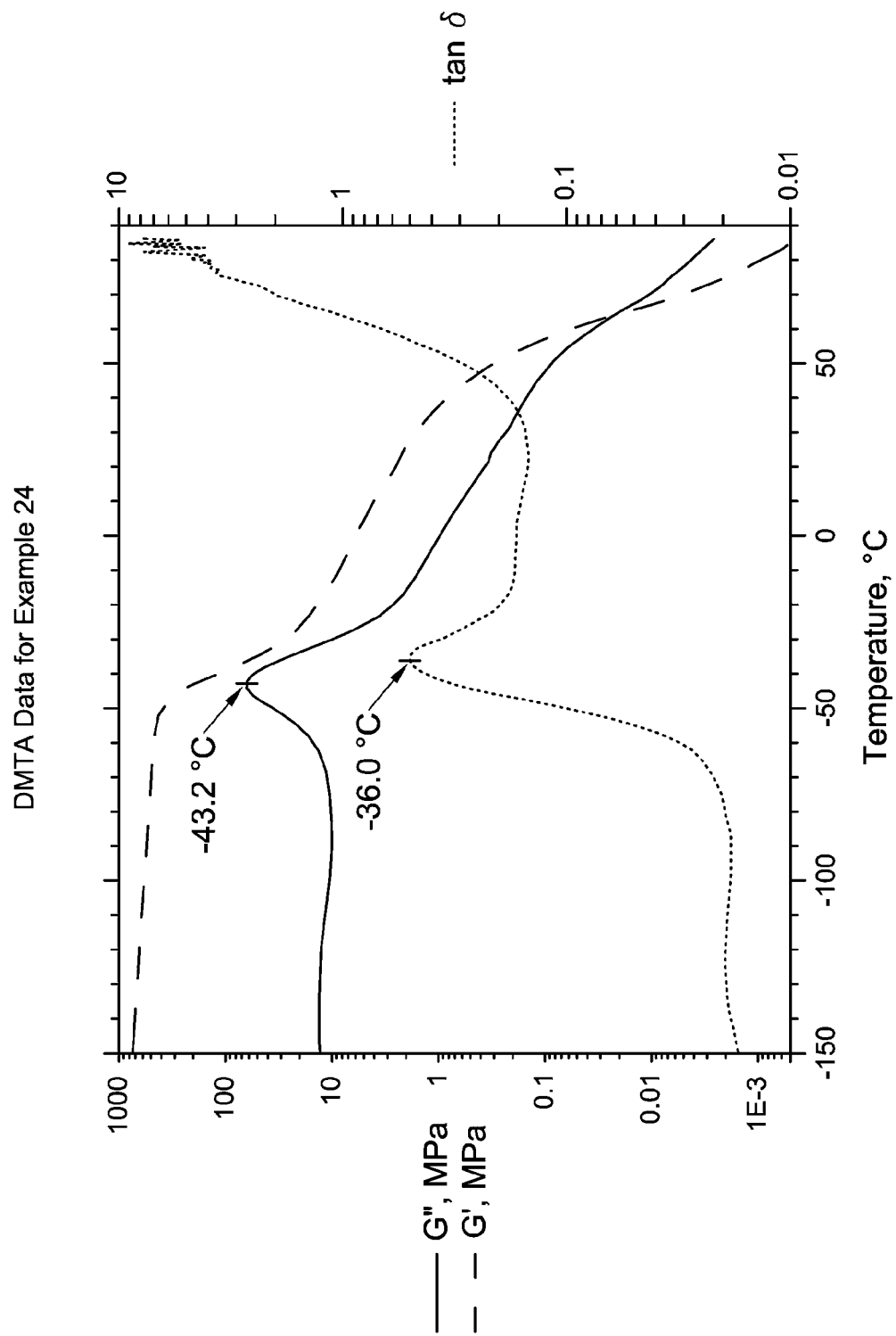

PROCESS TO PRODUCE ETHYLENE CONJUGATED DIENE COPOLYMERS AND COPOLYMERS THEREFROM

CROSS REFERENCE TO RELATED APPLICATIONS

This invention claims priority to and the benefit of U.S. Ser. No. 62/153,749, filed Apr. 28, 2015.

FIELD OF THE INVENTION

This invention relates to a process to produce ethylene conjugated diene (such as ethylene isoprene) copolymers using a scandium catalyst compound and the copolymers so produced.

BACKGROUND OF THE INVENTION

There are few catalysts that are known to be capable of copolymerizing ethylene and conjugated dienes (e.g., isoprene) using a coordination-insertion mechanism under industrially relevant conditions. The introduction of unsaturated carbon-carbon bonds into a polyolefin is of interest because this serves as, inter alia, a route to produce vulcanized and/or functionalized polymers. These polymers have numerous potential applications, including those that require adhesion to and compatability with other materials. One potential use for such materials is as a component in tire sidewalls and treads, where compatability and co-curability with other tire materials (e.g., natural rubber, styrene-butadiene rubber, and cis-polybutadiene) is desirable.

Polysisoprene homopolymers and polyethylene homopolymers were prepared by Doring, Kretschmer, and Kempe in the European Journal of Inorganic Chemistry 2010, pp. 2853-2860 using various aminopyridinate complexes; however, ethylene-isoprene copolymers are not disclosed.

Ethylene isoprene copolymers are also relatively rare. U.S. Pat. No. 6,288,191 B1 discloses the production of ethylene-isoprene random copolymers using a cyclopentadientyl-based titanium catalyst system, where the copolymers have high 1,4 isoprene isomer content.

J. Am. Chem. Soc., 2009, 131, pp. 13870-13882, discloses the production of ethylene-isoprene random copolymers using a cyclopentadienyl-based scandium catalyst system.

Catal. Sci. Technology, 2012, 2, pp. 2090-2098, discloses the attempted production of ethylene-isoprene copolymer using a cyclopentadienyl-titanium catalyst system where the copolymer has a melt peak at or above 133° C.

Eur. Polym. J., 1997, 33, 4, pp. 447-451, discloses the production of ethylene-isoprene copolymer using a zirconocene catalyst system, where the copolymer contains low content of isoprene and a high melting point of 119° C.

Polymer, 2008, 49, pp. 2039-2045, discloses the production of ethylene-isoprene copolymer using a neodymocene catalyst system where the copolymer has high isoprene content.

J. Polym. Sci. A, 2010, 48, pp. 4200-4206, discloses copolymerization of ethylene with isoprene promoted by titanium complexes containing a tetradentate [OSSO]-type bis(phenolato) ligand, where the copolymers have high 1,4 isoprene isomer content.

Other references of interest include: Macromol Chem Phys., 2001, 202, pp. 2485-2488; Macromolecules, 2002, 35, 1143-1145; JP-B-48-56775; US 2014/0018493; US 2014/0005327; and US 2013/0197174.

There is still a need in the art for new and improved catalysts capable of producing ethylene copolymers with conjugated dienes, including isoprene. Catalysts capable of producing high molecular weight copolymer under industrially relevant conditions are desired. Highly productive catalysts are desired. Catalysts capable of producing ethylene-isoprene copolymer with low levels of 1,4-isoprene insertions relative to 3,4-insertions are desired.

It is, therefore, an object of the present invention to provide a process to produce ethylene conjugated diene copolymers with excellent molecular weight (Mw) and polydispersity (Mw/Mn) using a family of Group 3 transition metal (preferably Sc or Y) catalysts at industrially relevant temperatures and pressures.

SUMMARY OF THE INVENTION

This invention relates to a process to produce copolymers comprising ethylene and conjugated diene (such as isoprene) comprising: contacting ethylene and conjugated diene with a catalyst system comprising an activator and a catalyst compound represented by the formula:

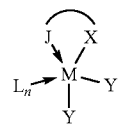

where M is scandium or yttrium;
X is an anionic donor group selected from amido, alkoxide, aryloxide, phosphido, and thiolate;
J is a neutral Lewis base;
X and J are joined to each other directly or by a bridging group that is one or two atoms in length;
each Y is an anionic leaving group, where the Y groups may be the same or different and two Y groups may be linked to form a dianionic group;
L is a neutral Lewis base;
where L may, or may not, be joined to the (JX) bidentate ligand via a linker group; and
n is 0, 1, or 2.

This invention also relates to embodiments where the catalyst compound described above is represented by the formula:

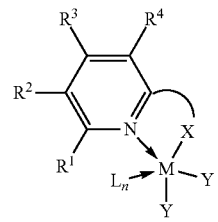

where M, X, Y, L, and n are defined as above;
X is joined to the pyridine group by a linker group that is one or two atoms in length;
$R^1$ is selected from hydrogen, alkyl, substituted alkyl, aryl, and substituted aryl; and
$R^2$, $R^3$, and $R^4$ are selected from hydrogen, alkyl, aryl, halogen, amino, alkoxy, silyl, and other groups containing 1 to 30 atoms; and
where L may, or may not, be joined to $R^1$ via a linker group.

This invention also relates to embodiments where the catalyst compound described above is represented by the formula:

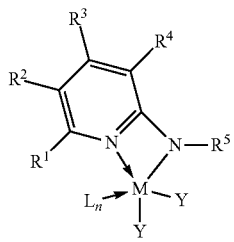

where M, Y, L, n, R¹, R², R³, and R⁴ are defined as above; and

R⁵ is selected from alkyl, substituted alkyl, aryl, and substituted aryl.

This invention further relates to polymer compositions produced by the methods described herein.

In an embodiment, the process above produces a copolymer comprising ethylene and conjugated diene, preferably an ethylene isoprene copolymer having:

1) from 75 to 90 mol % ethylene;
2) from 10 to 25 mol % isoprene;
3) a Tg of 0° C. or less;
4) 1,4 isoprene isomer is present at 60% or less of the total of 1,4, 3,4 and 1,2 isoprene isomers present;
5) 3,4 and 1,2 isoprene isomers are present at 40% or more of the total of 1,4, 3,4 and 1,2 isoprene isomers present; and
6) Mn of 250,000 g/mol or less.

BRIEF DESCRIPTION OF THE DRAWINGS

FIG. 1 is a DMTA plot for ethylene-isoprene copolymer of Example 24.

DEFINITIONS

For the purposes of this invention and the claims thereto, the new numbering scheme for the Periodic Table Groups is used as described in CHEMICAL AND ENGINEERING NEWS, 63(5), pg. 27 (1985). Therefore, a "Group 4 metal" is an element from Group 4 of the Periodic Table, e.g., Hf, Ti, or Zr.

An "olefin," alternatively referred to as "alkene," is a linear, branched, or cyclic compound of carbon and hydrogen having at least one double bond. For purposes of this specification and the claims appended thereto, when a polymer or copolymer is referred to as comprising an olefin, the olefin present in such polymer or copolymer is the polymerized form of the olefin. For example, when a copolymer is said to have an "ethylene" content of 35 wt % to 55 wt %, it is understood that the mer unit in the copolymer is derived from ethylene in the polymerization reaction and said derived units are present at 35 wt % to 55 wt %, based upon the weight of the copolymer. A "polymer" has two or more of the same or different mer units. A "homopolymer" is a polymer having mer units that are the same. A "copolymer" is a polymer having two or more mer units that are different from each other. A "terpolymer" is a polymer having three mer units that are different from each other. "Different" as used to refer to mer units indicates that the mer units differ from each other by at least one atom or are different isomerically. Accordingly, the definition of copolymer, as used herein, includes terpolymers and the like. An "ethylene polymer" or "ethylene copolymer" is a polymer or copolymer comprising at least 50 mol % ethylene derived units, a "propylene polymer" or "propylene copolymer" is a polymer or copolymer comprising at least 50 mol % propylene derived units, and so on.

For the purposes of this invention, ethylene shall be considered an α-olefin.

For the purposes of this invention and claims thereto, unless otherwise indicated, the term "aryl" or "aryl group" means an aromatic hydrocarbyl radical, preferably an aromatic cyclic structure having five or six members, such as the $C_6H_5$ radical, which is typically called phenyl. Aryl groups also include the derivatives of phenyl in which one to five of the hydrogen atoms have been replaced by additional hydrocarbyl groups. For example, aryls include groups such as 2,6-diisopropylphenyl, 2,4,6-trimethylphenyl, 2,3,4,5,6-pentamethylphenyl, 2-phenyl-4-methylphenyl, and the like.

For the purposes of this invention and claims thereto, unless otherwise indicated, the term "heteroatom" means a group 13, 14, 15, 16, or 17 non-metal element that is not carbon. Typical heteroatoms include nitrogen, oxygen, silicon, phosphorous, sulfur, fluorine, chlorine, bromine, and iodine.

For purposes of this invention and claims thereto, unless otherwise indicated, the term "substituted" means that a hydrogen group has been replaced with a heteroatom or a heteroatom-containing group.

The terms "hydrocarbyl radical," "hydrocarbyl" and "hydrocarbyl group" are used interchangeably throughout this document. Likewise the terms "group", "radical", and "substituent" are also used interchangeably in this document. For purposes of this disclosure, "hydrocarbyl radical" is defined to be radicals consisting of carbon and hydrogen, preferably $C_1$-$C_{100}$ radicals, that may be linear, branched, or cyclic, and when cyclic, aromatic or non-aromatic, and a "substituted hydrocarbyl" is a radical made of carbon and hydrogen where at least one hydrogen is replaced by a heteroatom or heteroatom-containing group.

For purposes of this invention and claims thereto in relation to Lewis bases described herein, the term "substituted" means that a hydrogen has been replaced with a hydrocarbyl group, a heteroatom, or a heteroatom-containing group. An example of a "substituted pyridine" is 2-phenylpyridine, which is a pyridine that has been substituted at the 2 position with a phenyl group.

As used herein, Mn is number average molecular weight, Mw is weight average molecular weight, and Mz is z average molecular weight, wt % is weight percent, and mol % is mole percent. Molecular weight distribution (MWD), also referred to as polydispersity, is defined to be Mw divided by Mn. Unless otherwise noted, all molecular weight units (e.g., Mw, Mn, Mz) are g/mol. The following abbreviations may be used herein: Me is methyl, Et is ethyl, Pr is propyl, n-Pr is n-propyl, iPr is isopropyl, Bu is butyl, iBu is isobutyl, sBu is sec-butyl, tBu is tert-butyl, Oct is octyl, Ph is phenyl, Bn is benzyl, THF or thf is tetrahydrofuran, and MAO is methylalumoxane.

A "catalyst system" is a combination of at least one catalyst compound, at least one activator, an optional co-activator, and an optional support material. For the purposes of this invention and the claims thereto, when catalyst systems are described as comprising neutral stable forms of the components, it is well understood by one of ordinary skill in the art, that the ionic form of the component is the form that reacts with the monomers to produce polymers. A polymerization catalyst system is a catalyst system that can polymerize monomers to polymer.

In the description herein, the catalyst may be described as a catalyst precursor, a pre-catalyst compound, a scandium catalyst compound or a transition metal compound, and these terms are used interchangeably. An "anionic ligand" is a negatively charged ligand which donates one or more pairs of electrons to a metal ion. Examples of anionic ligands include chloride, methyl anion (also known as methide), and dimethylamide. A "neutral donor ligand" is a neutrally charged ligand which donates one or more pairs of electrons to a metal ion. Examples of neutral donor ligands include tetrahydrofuran, dimethylsulfide, and pyridine.

A metallocene catalyst is defined as an organometallic compound with at least one π-bound cyclopentadienyl moiety (or substituted cyclopentadienyl moiety) and more frequently two π-bound cyclopentadienyl moieties or substituted cyclopentadienyl moieties.

Room temperature is 23° C. unless otherwise noted.

By 1,4 isoprene isomer is meant that when the isoprene is incorporated into the polymer chain, the microstructure of the isoprene derived unit is represented by one or both of the formulae:

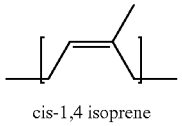
cis-1,4 isoprene

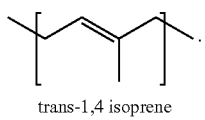
trans-1,4 isoprene

By 1,2 isoprene isomer is meant that when the isoprene is incorporated into the polymer chain, the microstructure of the isoprene derived unit is represented by the formula:

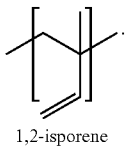
1,2-isoprene

By 3,4 isoprene isomer is meant that when the isoprene is incorporated into the polymer chain, the microstructure of the isoprene derived unit is represented by the formula:

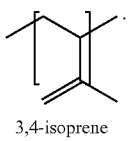
3,4-isoprene

Polymer microstructure is determined by 1H NMR as described below.

DETAILED DESCRIPTION OF THE INVENTION

This invention relates to a process to produce copolymers comprising ethylene and conjugated diene (such as isoprene) comprising:
1) contacting ethylene and conjugated diene (such as isoprene) with a catalyst system comprising an activator and a catalyst compound represented by the formula:

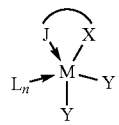

where M is scandium or yttrium (preferably scandium);
X is an anionic donor group selected from amido, alkoxide, aryloxide, phosphido, thiolate (preferably amido, arylamido, 2,6-disubstituted phenylamido);
J is a neutral Lewis base (preferably a nitrogen-containing heterocycle, preferably substituted pyridine);
X and J are joined to each other directly or by a bridging group that is one or two atoms in length;
each Y is an anionic leaving group (preferably alkyl, methyl, alkylsilane, $CH_2SiMe_3$);
where the Y groups may be the same or different and two Y groups may be linked to form a dianionic group;
L is a neutral Lewis base (preferably ether, cyclic ether, tetrahydrofuran);
where L may, or may not, be joined to the (JX) bidentate ligand via a linker group; and
n is 0, 1, or 2 (preferably 1).

The process described herein produces copolymers of ethylene and conjugated diene, preferably copolymers comprising ethylene and isoprene having:
1) from 75 to 90 mol % ethylene;
2) from 10 to 25 mol % isoprene;
3) a Tg of 0° C. or less;
4) 1,4 isoprene isomer present at 60% or less of the total of 1,4, 3,4 and 1,2 isoprene isomers present;
5) 3,4 and 1,2 isoprene isomers present at 40% or more of the total of 1,4, 3,4 and 1,2 isoprene isomers present; and
6) Mn of 250,000 g/mol or less.

Catalyst Compounds

This invention relates to transition metal complexes useful herein as catalyst components include non-cyclopentadienyl group 3 transition metal (scandium and/or yttrium) complexes containing one bidentate monoanionic ligand, two anionic ligands, and a neutral donor ligand.

In a preferred embodiment of the invention the transition metal complex is a scandium complex coordinated to an amido donor ligand containing a pendant neutral donor ligand, where the neutral donor ligand is a nitrogen heterocycle.

In a preferred embodiment of the invention the catalyst compound useful herein is represented by the formula (I):

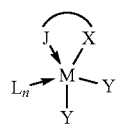

where M is scandium or yttrium (preferably scandium);
X is an anionic donor group selected from amido, alkoxide, aryloxide, phosphido, thiolate (preferably amido, arylamido, 2,6-disubstituted phenylamido); J is a neutral Lewis base (preferably a nitrogen-containing heterocycle, preferably substituted pyridine);
X and J are joined to each other directly or by a bridging group that is one or two atoms in length;
each Y is an anionic leaving group (preferably alkyl, methyl, alkylsilane, $CH_2SiMe_3$);

where the Y groups may be the same or different and two Y groups may be linked to form a dianionic group;

L is a neutral Lewis base (preferably ether, cyclic ether, tetrahydrofuran);

where L may, or may not, be joined to the (JX) bidentate ligand via a linker group; and n is 0, 1, or 2 (preferably 1).

This invention also relates to embodiments where the catalyst compound described above is represented by the formula (II):

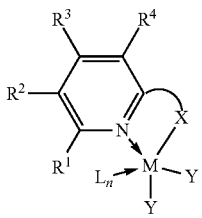

where M, X, Y, L, and n are as defined for formula (I);

X is joined to the pyridine group by a linker group that is one or two atoms in length;

$R^1$ is selected from hydrogen, alkyl, substituted alkyl, aryl (preferably 2,6-dialkylphenyl, 2,4,6-trialkylphenyl), substituted aryl;

$R^2$, $R^3$, and $R^4$ are selected from hydrogen, alkyl, aryl, halogen, amino, alkoxy, silyl, and other groups containing 1 to 30 atoms; and where L may, or may not, be joined to $R^1$ via a linker group.

This invention also relates to embodiments where the catalyst compound described above is represented by the formula (III):

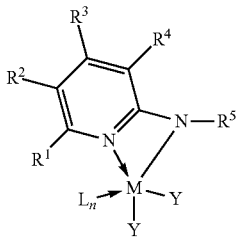

where M, Y, L, and n are as defined for formula (I) and $R^1$, $R^2$, $R^3$, and $R^4$ are as defined for formula (II); and $R^5$ is selected from alkyl, substituted alkyl, aryl (preferably 2,6-dialkylphenyl, 2,4,6-trialkylphenyl), substituted aryl.

In any embodiment of the invention described herein, M may be Sc or Y, preferably Sc.

In any embodiment of the invention described herein, each Y is selected from $C_1$ to $C_{30}$ alkyls, $C_1$ to $C_{30}$ alkylsilanes, preferably $C_1$ to $C_8$ alkyls, $C_1$ to $C_7$ alkylsilanes, such as: methyl, ethyl, propyl, butyl, pentyl, hexyl, heptyl, octyl, nonyl, decyl, undecyl, dodecyl, $CH_2SiMe_3$, benzyl, $CH_2CMe_3$, $CH(SiMe_3)_2$, $CH_2SiPh_3$, and $CH_2CMe_2Ph$ and isomers thereof.

In any embodiment of the invention described herein, L is selected from ether, cyclic ether, tetrahydrofuran, diethyl ether, methyl ethyl ether, methyl t-butyl ether, diethylsulfide, dimethylsulfide, trimethylamine, triethylamine, triphenylphosphine, triethylphosphine, trimethylphosphine, dimethylphenylphosphine, methyldiphenylphosphine, N,N,N',N'-tetramethylethylenediamine, $Me_2NCH_2CH_2OMe$, 2-methyltetrahydrofuran, 2-picoline, pyridine, substituted pyridine, and 2-phenylpyridine.

In any embodiment of the invention described herein, n is 1 or 2, preferably 1.

In any embodiment of the invention described herein, $R^1$ is selected from hydrogen, $C_1$ to $C_{30}$ alkyl, $C_1$ to $C_{30}$ substituted alkyl, $C_1$ to $C_{30}$ aryl, $C_1$ to $C_{30}$ substituted phenyl, preferably the $C_1$ to $C_{30}$ substitutent is selected from halogen atoms, methoxy, isopropoxy, ethoxy, dimethylamino, diethylamino, methyl, ethyl, propyl, butyl, opentyl, hexyl, heptyl, octyl, nonyl, decyl, undecyl, dodecyl and isomers thereof.

In any embodiment of the invention described herein, $R^1$ is selected from 2,6-dialkylphenyl, 2,4,6-trialkylphenyl, where the alkyl substituent is selected from methyl, ethyl, propyl, butyl, opentyl, hexyl, heptyl, octyl, nonyl, decyl, undecyl, dodecyl and isomers thereof Particularly useful $R^1$ groups include methyl, ethyl, propyl, butyl, pentyl, hexyl, heptyl, octyl, nonyl, decyl, undecyl, dodecyl, phenyl, benzyl, 2,6-dimethyl-phenyl, 2,4,6-trimethylphenyl, 2,6-diethylphenyl, 2,4,6-triethylphenyl, 2,6-dipropylphenyl, 2,4,6-tripropylphenyl, 2,6-diisopropylphenyl, 2,4,6-triisopropylphenyl, 3,5-di(t-butyl)phenyl, 3,5-dimethylphenyl, 2,3,4,5,6-pentamethylphenyl, 2,4,5-trimethylphenyl, 2,6-dichlorophenyl, 2,4,6-trichlorophenyl, 4-trimethylsilylphenyl, 4-triethylsilylphenyl, 2,6-di(t-butyl)phenyl, and 2,4-di(t-butyl)phenyl.

In any embodiment of the invention described herein, $R^1$, $R^2$, $R^3$, and $R^4$ are independently selected from: hydrogen, $C_1$ to $C_{30}$ alkyl, $C_1$ to $C_{30}$ aryl, halogen, amino, $C_1$ to $C_{30}$ alkoxy, and silyl groups, preferably selected from the group consisting of methyl, ethyl, propyl, butyl, pentyl, hexyl, heptyl, octyl, nonyl, decyl, undecyl, dodecyl, phenyl, benzyl, methylphenyl, dimethylamino, trimethylsilyl, triethylsilyl, $C(O)NMe_2$, $C(O)NEt_2$, and isomers thereof.

In any embodiment of the invention described herein, L may be joined to $R^1$ via a linker group and the linker group is a $C_1$ to $C_{30}$ alkyl, $C_1$ to $C_{30}$ substituted alkyl, $C_1$ to $C_{30}$ aryl, or $C_1$ to $C_{30}$ substituted phenyl, preferably 2-alkoxyphenyl, 2-aryloxyphenyl, alternately, the linker group is the linker group is selected from the group consisting of —$C_6H_4CH_2$—, —$C_6H_4CH_2CH_2$—, and —$C_6H_4CH_2CH_2CH_2$—.

In any embodiment of the invention described herein, $R^5$ is selected from hydrogen, $C_1$ to $C_{30}$ alkyl, $C_1$ to $C_{30}$ substituted alkyl, $C_1$ to $C_{30}$ aryl, $C_1$ to $C_{30}$ substituted aryl, preferably the $C_1$ to $C_{30}$ substitutent is selected from methyl, ethyl, propyl, butyl, pentyl, hexyl, heptyl, octyl, nonyl, decyl, undecyl, dodecyl and isomers thereof.

In any embodiment of the invention described herein, $R^5$ is selected from 2,6-dialkylphenyl, 2,4,6-trialkylphenyl, where the substituent is selected from methyl, ethyl, propyl, butyl, pentyl, hexyl, heptyl, octyl, nonyl, decyl, undecyl, dodecyl and isomers thereof.

Particularly useful $R^5$ groups include methyl, ethyl, propyl, butyl, pentyl, hexyl, heptyl, octyl, nonyl, decyl, undecyl, dodecyl, phenyl, benzyl, 2,6-dimethyl-phenyl, 2,4,6-trimethyl-phenyl, 2,6-diethyl-phenyl, 2,4,6-triethyl-phenyl, 2,6-dipropyl-phenyl, 2,4,6-tripropyl-phenyl, 2,6-diisopropyl-phenyl, 2,4,6-triisopropyl-phenyl, 2,4-di(t-butyl)phenyl, 2-t-butylphenyl, 2-ethylphenyl, 2-isopropylphenyl, and 2-ethyl-6-methylphenyl.

In any embodiment of the invention described herein, M is Sc and $R^1$ and $R^5$ are independently selected from 2-alkylphenyl, 2,6-dialkylphenyl, 2,4,6-trialkylphenyl, 2,3,4,5,6-pentaalkylphenyl, where the alkyl substituent is selected from methyl, ethyl, propyl, butyl, pentyl, hexyl, heptyl, octyl, nonyl, decyl, undecyl, dodecyl and isomers thereof.

Catalyst compounds that are particularly useful in this invention include one or more of: scandium aminopyridinates, yttrium aminopyridinates, scandium pyridylamides, ytrrium pyridylamides, scandium amidinates, and yttrium amidinates, particularly compounds represented by formula (IV):

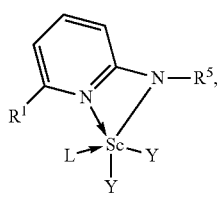

where:
$R^1$=2,4,6-triisopropylphenyl, $R^5$=2,4,6-trimethylphenyl, L=THF, Y=CH$_2$SiMe$_3$;
$R^1$=2,4,6-triisopropylphenyl, $R^5$=2,4,6-trimethylphenyl, L=THF, Y=Me;
$R^1$=2,4,6-triisopropylphenyl, $R^5$=2,4,6-trimethylphenyl, L=THF, Y=CH$_2$SiPhMe$_2$;
$R^1$=2,6-diisopropylphenyl, $R^5$=2,4,6-trimethylphenyl, L=THF, Y=CH$_2$SiMe$_3$;
$R^1$=2,6-diisopropylphenyl, $R^5$=2,4,6-trimethylphenyl, L=THF, Y=Me;
$R^1$=2,6-diisopropylphenyl, $R^5$=2,4,6-trimethylphenyl, L=THF, Y=CH$_2$SiPhMe$_2$;
$R^1$=2,4,6-triisopropylphenyl, $R^5$=2,6-dimethylphenyl, L=THF, Y=CH$_2$SiMe$_3$;
$R^1$=2,4,6-triisopropylphenyl, $R^5$=2,6-dimethylphenyl, L=THF, Y=Me;
$R^1$=2,4,6-triisopropylphenyl, $R^5$=2,6-dimethylphenyl, L=THF, Y=CH$_2$SiPhMe$_2$;
$R^1$=2,4,6-triisopropylphenyl, $R^5$=2,4,6-trimethylphenyl, L=2-methyltetrahydrofuran, Y=CH$_2$SiMe$_3$;
$R^1$=2,4,6-triisopropylphenyl, $R^5$=2,4,6-trimethylphenyl, L=2-methyltetrahydrofuran, Y=Me;
$R^1$=2,4,6-triisopropylphenyl, $R^5$=2,4,6-trimethylphenyl, L=2-methyltetrahydrofuran, Y=CH$_2$SiPhMe$_2$;
$R^1$=2,6-diisopropylphenyl, $R^5$=2,4,6-trimethylphenyl, L=2-methyltetrahydrofuran, Y=CH$_2$SiMe$_3$;
$R^1$=2,6-diisopropylphenyl, $R^5$=2,4,6-trimethylphenyl, L=2-methyltetrahydrofuran, Y=Me;
$R^1$=2,6-diisopropylphenyl, $R^5$=2,4,6-trimethylphenyl, L=2-methyltetrahydrofuran, Y=CH$_2$SiPhMe$_2$;
$R^1$=2,4,6-triisopropylphenyl, $R^5$=2,6-dimethylphenyl, L=2-methyltetrahydrofuran, Y=CH$_2$SiMe$_3$;
$R^1$=2,4,6-triisopropylphenyl, $R^5$=2,6-dimethylphenyl, L=2-methyltetrahydrofuran, Y=Me; or
$R^1$=2,4,6-triisopropylphenyl, $R^5$=2,6-dimethylphenyl, L=2-methyltetrahydrofuran, Y=CH$_2$SiPhMe$_2$.

In a preferred embodiment of the invention in any of the processes described herein one catalyst compound is used, e.g., the catalyst compounds are not different. For purposes of this invention one catalyst compound is considered different from another if they differ by at least one atom.

The catalyst compounds described herein are not metallocene compounds, particularly because they do not contain one or more cyclopentadienyl anion ligands bound to a transition metal center.

In some embodiments, two or more different catalyst compounds are present in the catalyst system used herein. In some embodiments, two or more different catalyst compounds are present in the reaction zone where the process(es) described herein occur. When two transition metal compound based catalysts are used in one reactor as a mixed catalyst system, the two transition metal compounds are preferably chosen such that the two are compatible. It is preferable to use the same activator for the transition metal compounds, however, two different activators, such as a non-coordinating anion activator and an alumoxane, can be used in combination. If one or more transition metal compounds contain a Y ligand which is not a hydride, hydrocarbyl, or substituted hydrocarbyl, then an alkylating reagent such as alumoxane or trialkylaluminum can be contacted with the transition metal compounds prior to addition of the non-coordinating anion activator.

The two transition metal compounds (pre-catalysts) may be used in any ratio. Preferred molar ratios of (A) transition metal compound to (B) transition metal compound fall within the range of (A:B) 1:1,000 to 1,000:1, alternatively 1:100 to 500:1, alternatively 1:10 to 200:1, alternatively 1:1 to 100:1, and alternatively 1:1 to 75:1, and alternatively 5:1 to 50:1. The particular ratio chosen will depend on the exact pre-catalysts chosen, the method of activation, and the end product desired. In a particular embodiment, when using the two pre-catalysts, where both are activated with the same activator, useful mole percents, based upon the molecular weight of the pre-catalysts, are 10 to 99.9% A to 0.1 to 90% B, alternatively 25 to 99% A to 0.5 to 50% B, alternatively 50 to 99% A to 1 to 25% B, and alternatively 75 to 99% A to 1 to 10% B.

Methods to Prepare the Catalyst Compounds.

Transition metal complexes of use as catalyst components may be prepared by alkane elimination reactions involving a transition metal alkyl with an amine reactant. Suitable transition metal alkyls include Sc or Y metal trialkyls containing additional coordinated Lewis base donors. Specific examples include Sc(CH$_2$SiMe$_3$)$_3$(THF)$_2$, Sc(CH$_2$Ph)$_3$(THF)$_3$, Y(CH$_2$SiMe$_3$)$_3$(THF)$_2$, and Y(CH$_2$Ph)$_3$(THF)$_2$.

In a useful embodiment, the catalyst compounds may be prepared by the process described in the European Journal of Inorganic Chemistry 2010, 2853-2860 or in the European Journal of Inorganic Chemistry 2009, pp. 4255-4264.

Activators

The terms "cocatalyst" and "activator" are used herein interchangeably and are defined to be any compound which can activate any one of the catalyst compounds described above by converting the neutral catalyst compound to a catalytically active catalyst compound cation. Non-limiting activators, for example, include alumoxanes, aluminum alkyls, ionizing activators, which may be neutral or ionic, and conventional-type cocatalysts. Preferred activators typically include alumoxane compounds, modified alumoxane compounds, and ionizing anion precursor compounds that abstract a reactive, σ-bound, metal ligand making the metal complex cationic and providing a charge-balancing noncoordinating or weakly coordinating anion.

In one embodiment, alumoxane activators are utilized as an activator in the catalyst composition. Alumoxanes are generally oligomeric compounds containing —Al(R$^1$)—O— sub-units, where R$^1$ is an alkyl group. Examples of alumoxanes include methylalumoxane (MAO), modified methylalumoxane (MMAO), ethylalumoxane and isobutylalumoxane. Alkylalumoxanes and modified alkylalumoxanes are suitable as catalyst activators, particularly when the abstractable ligand is an alkyl, halide, alkoxide, or amide.

Mixtures of different alumoxanes and modified alumoxanes may also be used. It may be preferable to use a visually clear methylalumoxane. A cloudy or gelled alumoxane can be filtered to produce a clear solution or clear alumoxane can be decanted from the cloudy solution. A useful alumoxane is a modified methyl alumoxane (MMAO) cocatalyst type 3A (commercially available from Akzo Chemicals, Inc. under the trade name Modified Methylalumoxane type 3A, covered under patent number U.S. Pat. No. 5,041,584).

When the activator is an alumoxane (modified or unmodified), some embodiments select the maximum amount of activator typically at up to a 5,000-fold molar excess Al/M over the catalyst compound (per metal catalytic site). The minimum activator-to-catalyst-compound is a 1:1 molar ratio. Alternate preferred ranges include from 1:1 to 500:1, alternately from 1:1 to 200:1, alternately from 1:1 to 100:1, or alternately from 1:1 to 50:1.

In an alternate embodiment, little or no alumoxane is used in the polymerization processes described herein. Preferably, alumoxane is present at zero mol %, alternately the alumoxane is present at a molar ratio of aluminum to catalyst compound transition metal less than 500:1, preferably less than 300:1, preferably less than 100:1, preferably less than 1:1.

The term "non-coordinating anion" (NCA) means an anion which either does not coordinate to a cation or which is only weakly coordinated to a cation thereby remaining sufficiently labile to be displaced by a neutral Lewis base. "Compatible" non-coordinating anions are those which are not degraded to neutrality when the initially formed complex decomposes. Further, the anion will not transfer an anionic substituent or fragment to the cation so as to cause it to form a neutral transition metal compound and a neutral by-product from the anion. Non-coordinating anions useful in accordance with this invention are those that are compatible, stabilize the transition metal cation in the sense of balancing its ionic charge at +1, and yet retain sufficient lability to permit displacement during polymerization.

It is within the scope of this invention to use an ionizing or stoichiometric activator, neutral or ionic, such as tri (n-butyl) ammonium tetrakis (pentafluorophenyl) borate, a tris perfluorophenyl boron metalloid precursor or a tris perfluoronaphthyl boron metalloid precursor, polyhalogenated heteroborane anions (WO 98/43983), boric acid (U.S. Pat. No. 5,942,459), or combination thereof. It is also within the scope of this invention to use neutral or ionic activators alone or in combination with alumoxane or modified alumoxane activators.

Examples of neutral stoichiometric activators include tri-substituted boron, tellurium, aluminum, gallium, and indium, or mixtures thereof. The three substituent groups are each independently selected from alkyls, alkenyls, halogens, substituted alkyls, aryls, arylhalides, alkoxy, and halides. Preferably, the three groups are independently selected from halogen, mono or multicyclic (including halosubstituted) aryls, alkyls, and alkenyl compounds, and mixtures thereof, preferred are alkenyl groups having 1 to 20 carbon atoms, alkyl groups having 1 to 20 carbon atoms, alkoxy groups having 1 to 20 carbon atoms and aryl groups having 3 to 20 carbon atoms (including substituted aryls). More preferably, the three groups are alkyls having 1 to 4 carbon groups, phenyl, naphthyl, or mixtures thereof. Even more preferably, the three groups are halogenated, preferably fluorinated, aryl groups. A preferred neutral stoichiometric activator is tris perfluorophenyl boron or tris perfluoronaphthyl boron.

Ionic stoichiometric activator compounds may contain an active proton, or some other cation associated with, but not coordinated to, or only loosely coordinated to, the remaining ion of the ionizing compound. Such compounds and the like are described in EP 0 570 982A; EP 0 520 732 A; EP 0 495 375 A; EP 0 500 944 B1; EP 0 277 003 A; EP 0 277 004 A; U.S. Pat. Nos. 5,153,157; 5,198,401; 5,066,741; 5,206,197; 5,241,025; 5,384,299; 5,502,124; and U.S. Ser. No. 08/285,380, filed Aug. 3, 1994; all of which are herein fully incorporated by reference.

Preferred compounds useful as an activator in the process of this invention comprise a cation, which is preferably a Bronsted acid capable of donating a proton, and a compatible non-coordinating anion which anion is relatively large (bulky), capable of stabilizing the active catalyst species (the Group 4 cation), which is formed when the two compounds are combined and said anion will be sufficiently labile to be displaced by olefinic, diolefinic and acetylenically unsaturated substrates or other neutral Lewis bases, such as ethers, amines, and the like. Two classes of useful compatible non-coordinating anions have been disclosed in EP 0 277 003 A1 and EP 0 277 004 A1: 1) anionic coordination complexes comprising a plurality of lipophilic radicals covalently coordinated to and shielding a central charge-bearing metal or metalloid core; and 2) anions comprising a plurality of boron atoms such as carboranes, metallacarboranes, and boranes.

In a preferred embodiment of the invention, the stoichiometric activators include a cation and an anion component, and are preferably represented by the following formula (II):

$$(Z)_d^+(A^{d-}) \qquad (II)$$

wherein Z is (L-H) or a reducible Lewis Acid, L is a neutral Lewis base; H is hydrogen; $(L-H)^+$ is a Bronsted acid; $A^{d-}$ is a non-coordinating anion having the charge d−; and d is an integer from 1 to 3.

When Z is (L-H) such that the cation component is $(L-H)_d^+$, the cation component may include Bronsted acids such as protonated Lewis bases capable of protonating a moiety, such as an alkyl or aryl, from the bulky ligand metallocene containing transition metal catalyst precursor, resulting in a cationic transition metal species. Preferably, the activating cation $(L-H)_d^+$ is a Bronsted acid, capable of donating a proton to the transition metal catalytic precursor resulting in a transition metal cation, including ammoniums, oxoniums, phosphoniums, silyliums, and mixtures thereof, preferably ammoniums of methylamine, aniline, dimethylamine, diethylamine, N-methylaniline, diphenylamine, trimethylamine, triethylamine, N,N-dimethylaniline, methyldiphenylamine, pyridine, p-bromo N,N-dimethylaniline, p-nitro-N,N-dimethylaniline, phosphoniums from triethylphosphine, triphenylphosphine, and diphenylphosphine, oxoniums from ethers, such as dimethyl ether, diethyl ether, tetrahydrofuran, and dioxane, sulfoniums from thioethers, such as diethyl thioethers and tetrahydrothiophene, and mixtures thereof.

When Z is a reducible Lewis acid it is preferably represented by the formula: $(Ar_3C^+)$, where Ar is aryl or aryl substituted with a heteroatom, a $C_1$ to $C_{40}$ hydrocarbyl, or a substituted $C_1$ to $C_{40}$ hydrocarbyl, preferably the reducible Lewis acid is represented by the formula: $(Ph_3C^+)$, where Ph is phenyl or phenyl substituted with a heteroatom, a $C_1$ to $C_{40}$ hydrocarbyl, or a substituted $C_1$ to $C_{40}$ hydrocarbyl. In a preferred embodiment of the invention, the reducible Lewis acid is triphenyl carbenium.

The anion component $A^{d-}$ include those having the formula $[M^k+Q_n]^{d-}$ wherein k is 1, 2, or 3; n is 1, 2, 3, 4, 5, or 6, preferably 3, 4, 5, or 6; n−k=d; M is an element selected from Group 13 of the Periodic Table of the Elements, preferably boron or aluminum, and Q is independently a hydride, bridged or unbridged dialkylamido, halide, alkoxide, aryloxide, hydrocarbyl, substituted hydrocarbyl, halocarbyl, substituted halocarbyl, and halosubstituted-hydrocarbyl radicals, said Q having up to 20 carbon atoms with the proviso that in not more than one occurrence is Q a halide, and two Q groups may form a ring structure. Preferably, each Q is a fluorinated hydrocarbyl group having 1 to 20 carbon atoms, more preferably each Q is a fluorinated aryl group, and most preferably each Q is a pentafluoryl aryl group. Examples of suitable $A^{d-}$ components also include diboron compounds as disclosed in U.S. Pat. No. 5,447,895, which is fully incorporated herein by reference.

In a preferred embodiment of the invention, this invention relates to a method to polymerize olefins comprising contacting olefins (preferably ethylene and or propylene) with the catalyst compound, an optional chain transfer agent and a boron containing NCA activator represented by the formula (14):

$$Z_d^+(A^{d-}) \tag{14}$$

where: Z is (L-H) or a reducible Lewis acid; L is a neutral Lewis base (as further described above); H is hydrogen; (L-H) is a Bronsted acid (as further described above); $A^{d-}$ is a boron containing non-coordinating anion having the charged (as further described above); d is 1, 2, or 3.

In a preferred embodiment of the invention in any NCA's represented by Formula 14 described above, the reducible Lewis acid is represented by the formula: $(Ar_3C^+)$, where Ar is aryl or aryl substituted with a heteroatom, a $C_1$ to $C_{40}$ hydrocarbyl, or a substituted $C_1$ to $C_{40}$ hydrocarbyl, preferably the reducible Lewis acid is represented by the formula: $(Ph_3C^+)$, where Ph is phenyl or phenyl substituted with a heteroatom, a $C_1$ to $C_{40}$ hydrocarbyl, or a substituted $C_1$ to $C_{40}$ hydrocarbyl.

In a preferred embodiment of the invention in any of the NCA's represented by Formula 14 described above, $Z_d^+$ is represented by the formula: $(L-H)_d^+$, wherein L is a neutral Lewis base; H is hydrogen; (L-H) is a Bronsted acid; and d is 1, 2, or 3, preferably $(L-H)_d^+$ is a Bronsted acid selected from ammoniums, oxoniums, phosphoniums, silyliums, and mixtures thereof.

In a preferred embodiment of the invention in any of the NCA's represented by Formula 14 described above, the anion component $A^{d-}$ is represented by the formula $[M^{*k^*+}Q^*_{n^*}]^{d^{*-}}$ wherein $k^*$ is 1, 2, or 3; $n^*$ is 1, 2, 3, 4, 5, or 6 (preferably 1, 2, 3, or 4); $n^*-k^*=d^*$; $M^*$ is boron; and $Q^*$ is independently selected from hydride, bridged or unbridged dialkylamido, halide, alkoxide, aryloxide, hydrocarbyl, substituted hydrocarbyl, halocarbyl, substituted halocarbyl, and halosubstituted-hydrocarbyl radicals, said $Q^*$ having up to 20 carbon atoms with the proviso that in not more than 1 occurrence is $Q^*$ a halide.

This invention also relates to a method to polymerize olefins comprising contacting olefins (such as ethylene and or propylene) with the catalyst compound, an optional chain transfer agent and an NCA activator represented by the formula (I):

$$R_nM^{**}(ArNHal)_{4-n} \tag{I}$$

where R is a monoanionic ligand; $M^{**}$ is a Group 13 metal or metalloid; ArNHal is a halogenated, nitrogen-containing aromatic ring, polycyclic aromatic ring, or aromatic ring assembly in which two or more rings (or fused ring systems) are joined directly to one another or together; and n is 0, 1, 2, or 3. Typically the NCA comprising an anion of Formula I also comprises a suitable cation that is essentially non-interfering with the ionic catalyst complexes formed with the transition metal compounds, preferably the cation is $Z_d^+$ as described above.

In a preferred embodiment of the invention in any of the NCA's comprising an anion represented by Formula I described above, R is selected from the group consisting of substituted or unsubstituted $C_1$ to $C_{30}$ hydrocarbyl aliphatic or aromatic groups, where substituted means that at least one hydrogen on a carbon atom is replaced with a hydrocarbyl, halide, halocarbyl, hydrocarbyl or halocarbyl substituted organometalloid, dialkylamido, alkoxy, aryloxy, alkysulfido, arylsulfido, alkylphosphido, arylphosphide, or other anionic substituent; fluoride; bulky alkoxides, where bulky means $C_4$ to $C_{20}$ hydrocarbyl groups; $—SR^1$, $—NR^2_2$, and $—PR^3_2$, where each $R^1$, $R^2$, or $R^3$ is independently a substituted or unsubstituted hydrocarbyl as defined above; or a $C_1$ to $C_{30}$ hydrocarbyl substituted organometalloid.

In a preferred embodiment of the invention in any of the NCA's comprising an anion represented by Formula I described above, the NCA also comprises cation comprising a reducible Lewis acid represented by the formula: $(Ar_3C^+)$, where Ar is aryl or aryl substituted with a heteroatom, a $C_1$ to $C_{40}$ hydrocarbyl, or a substituted $C_1$ to $C_{40}$ hydrocarbyl, preferably the reducible Lewis acid represented by the formula: $(Ph_3C^+)$, where Ph is phenyl or phenyl substituted with a heteroatom, a $C_1$ to $C_{40}$ hydrocarbyl, or a substituted $C_1$ to $C_{40}$ hydrocarbyl.

In a preferred embodiment of the invention in any of the NCA's comprising an anion represented by Formula I described above, the NCA also comprises a cation represented by the formula, $(L-H)_d^+$, wherein L is a neutral Lewis base; H is hydrogen; (L-H) is a Bronsted acid; and d is 1, 2, or 3, preferably $(L-H)_d^+$ is a Bronsted acid selected from ammoniums, oxoniums, phosphoniums, silyliums, and mixtures thereof.

Further examples of useful activators include those disclosed in U.S. Pat. Nos. 7,297,653 and 7,799,879.

Another activator useful herein comprises a salt of a cationic oxidizing agent and a noncoordinating, compatible anion represented by the formula (16):

$$(OX^{e+})_d(A^{d-})_e \tag{16}$$

wherein $OX^{e+}$ is a cationic oxidizing agent having a charge of e+; e is 1, 2, or 3; d is 1, 2, or 3; and $A^{d-}$ is a non-coordinating anion having the charge of d- (as further described above).

Examples of cationic oxidizing agents include: ferrocenium, hydrocarbyl-substituted ferrocenium, $Ag^+$, or $Pb^{+2}$. Preferred embodiments of $A^{d-}$ include tetrakis(pentafluorophenyl)borate.

In another embodiment, the amidinate catalyst compounds and optional CTA's described herein can be used with Bulky activators. A "Bulky activator" as used herein refers to anionic activators represented by the formula:

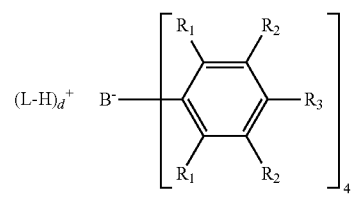

where: each $R_1$ is, independently, a halide, preferably a fluoride; each $R_2$ is, independently, a halide, a $C_6$ to $C_{20}$ substituted aromatic hydrocarbyl group or a siloxy group of the formula —O—Si—$R_a$, where $R_a$ is a $C_1$ to $C_{20}$ hydrocarbyl or hydrocarbylsilyl group (preferably $R_2$ is a fluoride or a perfluorinated phenyl group);

each $R_3$ is a halide, $C_6$ to $C_{20}$ substituted aromatic hydrocarbyl group or a siloxy group of the formula —O—Si—$R_a$, where $R_a$ is a $C_1$ to $C_{20}$ hydrocarbyl or hydrocarbylsilyl group (preferably $R_3$ is a fluoride or a $C_6$ perfluorinated aromatic hydrocarbyl group); wherein $R_2$ and $R_3$ can form one or more saturated or unsaturated, substituted or unsubstituted rings (preferably $R_2$ and $R_3$ form a perfluorinated phenyl ring); L is a neutral Lewis base; $(L-H)^+$ is a Bronsted acid; d is 1, 2, or 3; wherein the anion has a molecular weight of greater than 1020 g/mol; and wherein at least three of the substituents on the B atom each have a molecular volume of greater than 250 cubic Å, alternately greater than 300 cubic Å, or alternately greater than 500 cubic Å.

"Molecular volume" is used herein as an approximation of spatial steric bulk of an activator molecule in solution. Comparison of substituents with differing molecular volumes allows the substituent with the smaller molecular volume to be considered "less bulky" in comparison to the substituent with the larger molecular volume. Conversely, a substituent with a larger molecular volume may be considered "more bulky" than a substituent with a smaller molecular volume.

Molecular volume may be calculated as reported in "A Simple "Back of the Envelope" Method for Estimating the Densities and Molecular Volumes of Liquids and Solids," Journal of Chemical Education, Vol. 71, No. 11, November, 1994, pp. 962-964. Molecular volume (MV), in units of cubic Å, is calculated using the formula: MV=8.3$V_s$, where $V_s$ is the scaled volume. $V_s$ is the sum of the relative volumes of the constituent atoms, and is calculated from the molecular formula of the substituent using the following table of relative volumes. For fused rings, the $V_s$ is decreased by 7.5% per fused ring.

| Element | Relative Volume |
|---|---|
| H | 1 |
| $1^{st}$ short period, Li to F | 2 |
| $2^{nd}$ short period, Na to Cl | 4 |
| $1^{st}$ long period, K to Br | 5 |
| $2^{nd}$ long period, Rb to I | 7.5 |
| $3^{rd}$ long period, Cs to Bi | 9 |

Exemplary bulky substituents of activators suitable herein and their respective scaled volumes and molecular volumes are shown in the table below. The dashed bonds indicate binding to boron, as in the general formula above.

| Activator | Structure of boron substituents | Molecular Formula of each substituent | $V_s$ | MV Per subst. (Å$^3$) | Total MV (Å$^3$) |
|---|---|---|---|---|---|
| Dimethylanilinium tetrakis(perfluoronaphthyl)borate | | $C_{10}F_7$ | 34 | 261 | 1044 |
| Dimethylanilinium tetrakis(perfluorobiphenyl)borate | | $C_{12}F_9$ | 42 | 349 | 1396 |
| [4-tButyl-PhNMe$_2$H] [((C$_6$F$_3$(C$_6$F$_5$)$_2$)$_4$B] | | $C_{18}F_{13}$ | 62 | 515 | 2060 |

Exemplary bulky activators useful in catalyst systems herein include: trimethylammonium tetrakis(perfluoronaphthyl)borate, triethylammonium tetrakis(perfluoronaphthyl)borate, tripropylammonium tetrakis(perfluoronaphthyl)borate, tri(n-butyl)ammonium tetrakis(perfluoronaphthyl)borate, tri(t-butyl)ammonium tetrakis(perfluoronaphthyl)borate, N,N-dimethylanilinium tetrakis(perfluoronaphthyl)borate, N,N-diethylanilinium tetrakis(perfluoronaphthyl)borate, N,N-dimethyl-(2,4,6-trimethylanilinium)tetrakis(perfluoronaphthyl)borate, tropillium tetrakis(perfluoronaphthyl)borate, triphenylcarbenium tetrakis(perfluoronaphthyl)borate, triphenylphosphonium tetrakis(perfluoronaphthyl)borate, triethylsilylium tetrakis(perfluoronaphthyl)borate, benzene(diazonium)tetrakis(perfluoronaphthyl)borate, trimethylammonium tetrakis(perfluorobiphenyl)borate, triethylammonium tetrakis(perfluorobiphenyl)borate, tripropylammonium tetrakis(perfluorobiphenyl)borate, tri(n-butyl)ammonium tetrakis(perfluorobiphenyl)borate, tri(t-butyl)ammonium tetrakis(perfluorobiphenyl)borate, N,N-dimethylanilinium tetrakis(perfluorobiphenyl)borate, N,N-diethylanilinium tetrakis(perfluorobiphenyl)borate, N,N-dimethyl-(2,4,6-trimethylanilinium)tetrakis(perfluorobiphenyl)borate, tropillium tetrakis(perfluorobiphenyl)borate, triphenylcarbenium tetrakis(perfluorobiphenyl)borate, triphenylphosphonium tetrakis(perfluorobiphenyl)borate, triethylsilylium tetrakis(perfluorobiphenyl)borate, benzene(diazonium)tetrakis(perfluorobiphenyl)borate, [4-t-butyl-PhNMe$_2$H][(C$_6$F$_3$(C$_6$F$_5$)$_2$)$_4$B], and the types disclosed in U.S. Pat. No. 7,297,653.

Illustrative, but not limiting, examples of boron compounds which may be used as an activator in the processes of this invention are:

trimethylammonium tetraphenylborate, triethylammonium tetraphenylborate, tripropylammonium tetraphenylborate, tri(n-butyl)ammonium tetraphenylborate, tri(t-butyl)ammonium tetraphenylborate, N,N-dimethylanilinium tetraphenylborate, N,N-diethylanilinium tetraphenylborate, N,N-dimethyl-(2,4,6-trimethylanilinium) tetraphenylborate, tropillium tetraphenylborate, triphenylcarbenium tetraphenylborate, triphenylphosphonium tetraphenylborate triethylsilylium tetraphenylborate, benzene(diazonium)tetraphenylborate, trimethylammonium tetrakis(pentafluorophenyl)borate, triethylammonium tetrakis(pentafluorophenyl)borate, tripropylammonium tetrakis(pentafluorophenyl)borate, tri(n-butyl)ammonium tetrakis(pentafluorophenyl)borate, tri(sec-butyl)ammonium tetrakis(pentafluorophenyl)borate, N,N-dimethylanilinium tetrakis(pentafluorophenyl)borate, N,N-diethylanilinium tetrakis(pentafluorophenyl)borate, N,N-dimethyl-(2,4,6-trimethylanilinium) tetrakis(pentafluorophenyl)borate, tropillium tetrakis(pentafluorophenyl)borate, triphenylcarbenium tetrakis(pentafluorophenyl)borate, triphenylphosphonium tetrakis(pentafluorophenyl)borate, triethylsilylium tetrakis(pentafluorophenyl)borate, benzene(diazonium) tetrakis(pentafluorophenyl)borate, trimethylammonium tetrakis-(2,3,4,6-tetrafluorophenyl) borate, triethylammonium tetrakis-(2,3,4,6-tetrafluorophenyl)borate, tripropylammonium tetrakis-(2,3,4,6-tetrafluorophenyl)borate, tri(n-butyl)ammonium tetrakis-(2,3,4,6-tetrafluoro-phenyl)borate, dimethyl(t-butyl)ammonium tetrakis-(2,3,4,6-tetrafluorophenyl)borate, N,N-dimethylanilinium tetrakis-(2,3,4,6-tetrafluorophenyl)borate, N,N-diethylanilinium tetrakis-(2,3,4,6-tetrafluorophenyl)borate, N,N-dimethyl-(2,4,6-trimethylanilinium) tetrakis-(2,3,4,6-tetrafluorophenyl)borate, tropillium tetrakis-(2,3,4,6-tetrafluorophenyl)borate, triphenylcarbenium tetrakis-(2,3,4,6-tetrafluorophenyl)borate, triphenylphosphonium tetrakis-(2,3,4,6-tetrafluorophenyl)borate, triethylsilylium tetrakis-(2,3,4,6-tetrafluorophenyl)borate, benzene(diazonium) tetrakis-(2,3,4,6-tetrafluorophenyl)borate, trimethylammonium tetrakis(perfluoronaphthyl)borate, triethylammonium tetrakis(perfluoronaphthyl)borate, tripropylammonium tetrakis(perfluoronaphthyl)borate, tri(n-butyl)ammonium tetrakis(perfluoronaphthyl)borate, tri(t-butyl)ammonium tetrakis(perfluoronaphthyl)borate, N,N-dimethylanilinium tetrakis(perfluoronaphthyl)borate, N,N-diethylanilinium tetrakis(perfluoronaphthyl)borate, N,N-dimethyl-(2,4,6-trimethylanilinium) tetrakis(perfluoronaphthyl)borate, tropillium tetrakis(perfluoronaphthyl)borate, triphenylcarbenium tetrakis(perfluoronaphthyl)borate, triphenylphosphonium tetrakis(perfluoronaphthyl)borate, triethylsilylium tetrakis(perfluoronaphthyl)borate, benzene(diazonium) tetrakis(perfluoronaphthyl)borate, trimethylammonium tetrakis(perfluorobiphenyl)borate, triethylammonium tetrakis(perfluorobiphenyl)borate, tripropylammonium tetrakis(perfluorobiphenyl)borate, tri(n-butyl)ammonium tetrakis(perfluorobiphenyl)borate, tri(t-butyl)ammonium tetrakis(perfluorobiphenyl)borate, N,N-dimethylanilinium tetrakis(perfluorobiphenyl)borate, N,N-diethylanilinium tetrakis(perfluorobiphenyl)borate, N,N-dimethyl-(2,4,6-trimethylanilinium) tetrakis(perfluorobiphenyl)borate, tropillium tetrakis(perfluorobiphenyl)borate, triphenylcarbenium tetrakis(perfluorobiphenyl)borate, triphenylphosphonium tetrakis(perfluorobiphenyl)borate, triethylsilylium tetrakis(perfluorobiphenyl)borate, benzene(diazonium) tetrakis(perfluorobiphenyl)borate, trimethylammonium tetrakis(3,5-bis(trifluoromethyl)phenyl)borate, triethylammonium tetrakis(3,5-bis(trifluoromethyl)phenyl)borate, tripropylammonium tetrakis(3,5-bis(trifluoromethyl)phenyl)borate, tri(n-butyl)ammonium tetrakis(3,5-bis(trifluoromethyl)phenyl)borate, tri(t-butyl)ammonium tetrakis(3,5-bis(trifluoromethyl)phenyl)borate, N,N-dimethylanilinium tetrakis(3,5-bis(trifluoromethyl)phenyl)borate, N,N-diethylanilinium tetrakis(3,5-bis(trifluoromethyl)phenyl)borate, N,N-dimethyl-(2,4,6-trimethylanilinium) tetrakis(3,5-bis(trifluoromethyl)phenyl)borate, tropillium tetrakis(3,5-bis(trifluoromethyl)phenyl)borate, triphenylcarbenium tetrakis(3,5-bis(trifluoromethyl)phenyl)borate, triphenylphosphonium tetrakis(3,5-bis(trifluoromethyl)phenyl)borate, triethylsilylium tetrakis(3,5-bis(trifluoromethyl)phenyl)borate, benzene(diaz onium) tetrakis(3,5-bis(trifluoromethyl)phenyl)borate, and dialkyl ammonium salts, such as: di-(i-propyl)ammonium tetrakis(pentafluorophenyl)borate, and dicyclohexylammonium tetrakis(pentafluorophenyl)borate; and additional tri-substituted phosphonium salts, such as tri(o-tolyl)phosphonium tetrakis(pentafluorophenyl)borate, and tri(2,6-dimethylphenyl)phosphonium tetrakis(pentafluorophenyl)borate.

Preferred activators include N,N-dimethylanilinium tetrakis(perfluoronaphthyl)borate, N,N-dimethylanilinium tetrakis(perfluorobiphenyl)borate, N,N-dimethylanilinium tetrakis(3,5-bis(trifluoromethyl)phenyl)borate, triphenylcarbenium tetrakis(perfluoronaphthyl)borate, triphenylcarbenium tetrakis(perfluorobiphenyl)borate, triphenylcarbenium tetrakis(3,5-bis(trifluoromethyl)phenyl)borate, triphenylcarbenium tetrakis(perfluorophenyl)borate, [Ph$_3$C$^+$][B(C$_6$F$_5$)$_4^-$], [Me$_3$NH$^+$][B(C$_6$F$_5$)$_4^-$]; 1-(4-(tris(pentafluorophenyl)borate)-2,3,5,6-tetrafluorophenyl)pyrrolidinium; and tetrakis(pentafluorophenyl)borate, 4-(tris(pentafluorophenyl)borate)-2,3,5,6-tetrafluoropyridine.

In a preferred embodiment of the invention, the activator comprises a triaryl carbonium (such as triphenylcarbenium tetraphenylborate, triphenylcarbenium tetrakis(pentafluorophenyl)borate, triphenylcarbenium tetrakis-(2,3,4,6-tetrafluorophenyl)borate, triphenylcarbenium tetrakis(perfluoronaphthyl)borate, triphenylcarbenium tetrakis (perfluorobiphenyl)borate, triphenylcarbenium tetrakis(3,5-bis(trifluoromethyl)phenyl)borate).

In another embodiment, the activator comprises one or more of trialkylammonium tetrakis(pentafluorophenyl)borate, N,N-dialkylanilinium tetrakis(pentafluorophenyl)borate, N,N-dimethyl-(2,4,6-trimethylanilinium) tetrakis(pentafluorophenyl)borate, trialkylammonium tetrakis-(2,3,4,6-tetrafluorophenyl) borate, N,N-dialkylanilinium tetrakis-(2,3,4,6-tetrafluorophenyl)borate, trialkylammonium tetrakis (perfluoronaphthyl)borate, N,N-dialkylanilinium tetrakis (perfluoronaphthyl)borate, trialkyammonium tetrakis (perfluorobiphenyl)borate, N,N-dialkylanilinium tetrakis (perfluorobiphenyl)borate, trialkylammonium tetrakis(3,5-bis(trifluoromethyl)phenyl)borate, N,N-dialkylanilinium tetrakis(3,5-bis(trifluoromethyl)phenyl)borate, N,N-dialkyl-(2,4,6-trimethylanilinium) tetrakis(3,5-bis(trifluoromethyl) phenyl)borate, di-(i-propyl)ammonium tetrakis(pentafluorophenyl)borate, (where alkyl is methyl, ethyl, propyl, n-butyl, sec-butyl, or t-butyl).

In a preferred embodiment of the invention, any of the activators described herein may be mixed together before or after combination with the catalyst compound preferably before being mixed with the catalyst compound.

In some embodiments, two NCA activators may be used in the polymerization and the molar ratio of the first NCA activator to the second NCA activator can be any ratio. In some embodiments, the molar ratio of the first NCA activator to the second NCA activator is 0.01:1 to 10,000:1, preferably 0.1:1 to 1,000:1, preferably 1:1 to 100:1.

Further, the typical activator-to-catalyst ratio, e.g., all NCA activators-to-catalyst ratio is a 1:1 molar ratio. Alternate preferred ranges include from 0.1:1 to 100:1, alternately from 0.5:1 to 200:1, alternately from 1:1 to 500:1, alternately from 1:1 to 1000:1. A particularly useful range is from 0.5:1 to 10:1, preferably 1:1 to 5:1.

Additionally, preferred activators useful herein include those described in U.S. Pat. No. 7,247,687 at column 169, line 50 to column 174, line 43, particularly column 172, line 24 to column 173, line 53.

It is also within the scope of this invention that the catalyst compounds can be combined with combinations of alumoxanes and NCA's (see for example, U.S. Pat. Nos. 5,153,157; 5,453,410; EP 0 573 120 B1; WO 94/07928; and WO 95/14044 which discuss the use of an alumoxane in combination with an ionizing activator).

Chain Transfer Agents

Useful chain transfer agents are typically alkylalumoxanes or alkylzincs, preferably a compound represented by the formula $AlR_3$, $ZnR_2$ (where each R is, independently, a $C_1$-$C_8$ aliphatic radical, preferably methyl, ethyl, propyl, butyl, penyl, hexyl octyl or an isomer thereof) or a combination thereof, such as diethyl zinc, methylalumoxane, trimethylaluminum, triisobutylaluminum, trioctylaluminum, or a combination thereof.

Optional Scavengers or Co-Activators

In addition to the above activator compounds, scavengers or co-activators may be used. Aluminum alkyl or organoaluminum compounds which may be utilized as scavengers or co-activators include, for example, trimethylaluminum, triethylaluminum, triisobutylaluminum, tri-n-hexylaluminum, tri-n-octylaluminum, and diethyl zinc.

Optional Support Materials

In embodiments herein, the catalyst system may comprise an inert support material. Preferably the supported material is a porous support material, for example, talc, and inorganic oxides. Other support materials include zeolites, clays, organoclays, or any other organic or inorganic support material and the like, or mixtures thereof.

Preferably, the support material is an inorganic oxide in a finely divided form. Suitable inorganic oxide materials for use in metallocene catalyst systems herein include Groups 2, 4, 13, and 14 metal oxides, such as silica, alumina, and mixtures thereof. Other inorganic oxides that may be employed either alone or in combination with the silica, or alumina are magnesia, titania, zirconia, and the like. Other suitable support materials, however, can be employed, for example, finely divided functionalized polyolefins, such as finely divided polyethylene. Particularly useful supports include magnesia, titania, zirconia, montmorillonite, phyllosilicate, zeolites, talc, clays, and the like. Also, combinations of these support materials may be used, for example, silica-chromium, silica-alumina, silica-titania, and the like. Preferred support materials include $Al_2O_3$, $ZrO_2$, $SiO_2$, and combinations thereof, more preferably $SiO_2$, $Al_2O_3$, or $SiO_2$/$Al_2O_3$ It is preferred that the support material, most preferably an inorganic oxide, has a surface area in the range of from about 10 to about 700 $m^2$/g, pore volume in the range of from about 0.1 to about 4.0 cc/g and average particle size in the range of from about 5 to about 500 μm. More preferably, the surface area of the support material is in the range of from about 50 to about 500 $m^2$/g, pore volume of from about 0.5 to about 3.5 cc/g and average particle size of from about 10 to about 200 μm. Most preferably the surface area of the support material is in the range is from about 100 to about 400 $m^2$/g, pore volume from about 0.8 to about 3.0 cc/g and average particle size is from about 5 to about 100 μm. The average pore size of the support material useful in the invention is in the range of from 10 to 1000 Å, preferably 50 to about 500 Å, and most preferably 75 to about 350 Å. In some embodiments, the support material is a high surface area, amorphous silica (surface area=300 $m^2$/gm; pore volume of 1.65 $cm^3$/gm). Preferred silicas are marketed under the tradenames of DAVISON 952 or DAVISON 955 by the Davison Chemical Division of W.R. Grace and Company. In other embodiments DAVISON 948 is used.

The support material should be dry, that is, free of absorbed water. Drying of the support material can be effected by heating or calcining at about 100° C. to about 1,000° C., preferably at least about 600° C. When the support material is silica, it is heated to at least 200° C., preferably about 200° C. to about 850° C., and most preferably at about 600° C.; and for a time of about 1 minute to about 100 hours, from about 12 hours to about 72 hours, or from about 24 hours to about 60 hours. The calcined support material must have at least some reactive hydroxyl (OH) groups to produce supported catalyst systems of this invention. The calcined support material is then contacted with at least one polymerization catalyst comprising at least one metallocene compound and an activator.

The support material, having reactive surface groups, typically hydroxyl groups, is slurried in a non-polar solvent and the resulting slurry is contacted with a solution of a metallocene compound and an activator. In some embodiments, the slurry of the support material is first contacted with the activator for a period of time in the range of from about 0.5 hours to about 24 hours, from about 2 hours to about 16 hours, or from about 4 hours to about 8 hours. The solution of the metallocene compound is then contacted with the isolated support/activator. In some embodiments, the supported catalyst system is generated in situ. In an alternate embodiment, the slurry of the support material is first contacted with the catalyst compound for a period of time in the range of from about 0.5 hours to about 24 hours, from about 2 hours to about 16 hours, or from about 4 hours to about 8 hours. The slurry of the supported metallocene compound is then contacted with the activator solution.

The mixture of the metallocene, activator and support is heated to about 0° C. to about 70° C., preferably to about 23° C. to about 60° C., preferably at room temperature. Contact times typically range from about 0.5 hours to about 24 hours, from about 2 hours to about 16 hours, or from about 4 hours to about 8 hours.

Suitable non-polar solvents are materials in which all of the reactants used herein, i.e., the activator, and the metallocene compound, are at least partially soluble and which are liquid at reaction temperatures. Preferred non-polar solvents are alkanes, such as isopentane, hexane, n-heptane, octane, nonane, and decane, although a variety of other materials including cycloalkanes, such as cyclohexane, aromatics, such as benzene, toluene, and ethylbenzene, may also be employed.

Polymerization Processes

In embodiments herein, the invention relates to polymerization processes where monomer comprising ethylene and conjugated diene (such as isoprene) are contacted with a catalyst system comprising an activator and at least one catalyst compound, as described above. The catalyst compound and activator may be combined in any order, and are combined typically prior to contacting with the monomer.

Preferred conjugated diene monomers useful in this invention include any hydrocarbon structure, preferably $C_4$ to $C_{30}$, having at least two unsaturated bonds that are adjacent to each other. Examples of useful conjugated dienes include isoprene, 1,3-butadiene, 1,3-pentadiene, 1,3-hexadiene, 1,3-heptadiene, 1,3-octadiene, 1,3-nonadiene, 1,3-decadiene, cyclopentadiene, dicyclopentadiene or higher ring containing diolefins with or without substituents at various ring positions.

Polymerization processes of this invention can be carried out in any manner known in the art. Any suspension, homogeneous, bulk, solution, slurry, or gas phase polymerization process known in the art can be used. Such processes can be run in a batch, semi-batch, or continuous mode. Homogeneous polymerization processes and slurry processes are preferred. (A homogeneous polymerization process is defined to be a process where at least 90 wt % of the product is soluble in the reaction media.) A bulk homogeneous process is particularly preferred. (A bulk process is defined to be a process where monomer concentration in all feeds to the reactor is 70 vol % or more.) Alternately, no solvent or diluent is present or added in the reaction medium, (except for the small amounts used as the carrier for the catalyst system or other additives, or amounts typically found with the monomer; e.g., propane in propylene). In another embodiment, the process is a slurry process. As used herein, the term "slurry polymerization process" means a polymerization process where a supported catalyst is employed and monomers are polymerized on the supported catalyst particles. At least 95 wt % of polymer products derived from the supported catalyst are in granular form as solid particles (not dissolved in the diluent).

Suitable diluents/solvents for polymerization include non-coordinating, inert liquids. Examples include straight and branched-chain hydrocarbons, such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof, such as can be found commercially (Isopar™); perhalogenated hydrocarbons, such as perfluorinated $C_{4-10}$ alkanes, chlorobenzene, and aromatic and alkylsubstituted aromatic compounds, such as benzene, toluene, mesitylene, and xylene. Suitable solvents also include liquid olefins which may act as monomers or comonomers including ethylene, propylene, 1-butene, 1-hexene, 1-pentene, 3-methyl-1-pentene, 4-methyl-1-pentene, 1-octene, 1-decene, and mixtures thereof. In a preferred embodiment of the invention, aliphatic hydrocarbon solvents are used as the solvent, such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof. In another embodiment, the solvent is not aromatic, preferably aromatics are present in the solvent at less than 1 wt %, preferably less than 0.5 wt %, preferably less than 0 wt % based upon the weight of the solvents.

In a preferred embodiment of the invention, the feed concentration of the monomers and comonomers for the polymerization is 60 vol % solvent or less, preferably 40 vol % or less, or preferably 20 vol % or less, based on the total volume of the feedstream. Preferably the polymerization is run in a bulk process.

Preferred polymerizations can be run at any temperature and/or pressure suitable to obtain the desired ethylene polymers. Typical temperatures and/or pressures include a temperature in the range of from about 0° C. to about 300° C., preferably about 20° C. to about 200° C., preferably about 35° C. to about 150° C., preferably from about 60° C. to about 120° C., preferably from about 70° C. to about 120° C., preferably from about 75° C. to about 120° C.; and at a pressure in the range of from about 0.35 MPa to about 10 MPa, preferably from about 0.45 MPa to about 6 MPa, or preferably from about 0.5 MPa to about 4 MPa.

In a typical polymerization, the run time of the reaction is up to 300 minutes, preferably in the range of from about 5 to 250 minutes, or preferably from about 10 to 120 minutes.

In some embodiments, hydrogen is present in the polymerization reactor at a partial pressure of 0.001 to 50 psig (0.007 to 345 kPa), preferably from 0.01 to 25 psig (0.07 to 172 kPa), more preferably 0.1 to 10 psig (0.7 to 70 kPa).

In a preferred embodiment of the invention, little or no alumoxane is used in the process to produce the polymers. Optionally, alumoxane is present at zero mol %, alternately the alumoxane is present at a molar ratio of aluminum to transition metal less than 500:1, preferably less than 300:1, preferably less than 100:1, preferably less than 1:1.

In a preferred embodiment of the invention, little or no scavenger is used in the process to produce the ethylene polymer. Preferably, scavenger (such as trialkylaluminum) is present at zero mol %, alternately, the scavenger is present at a molar ratio of scavenger metal to transition metal of less than 100:1, preferably less than 50:1, preferably less than 15:1, preferably less than 10:1.

Other additives may also be used in the polymerization, as desired, such as one or more scavengers, promoters, modifiers, chain transfer agents (such as trialkylaluminums, triisobutylaluminum, tri(n-octyl)aluminum, diethylzinc), reducing agents, oxidizing agents, hydrogen, aluminum alkyls, or silanes.

Polyolefin Products

This invention also relates to compositions of matter produced by the methods described herein.

In a preferred embodiment of the invention, the process described herein produces copolymers comprising from 1 to 99 mol % (preferably 50 to 95 mol %, preferably 75 to 90 mol %) ethylene and from 99 to 1 mol % (preferably 50 to 5 mol %, preferably 10 to 25 mol %, preferably 15 to 25 mol %, preferably 10 to 25 mol %) conjugated diene.

In a preferred embodiment of the invention, the process described herein produces copolymers comprising from 1 to 99 mol % (preferably 50 to 95 mol %, preferably 75 to 90 mol %) ethylene and from 99 to 1 mol % (preferably 50 to 5 mol %, preferably 10 to 25 mol % (preferably 15 to 25 mol %, preferably 10 to 25 mol %) isoprene.

Likewise, the process of this invention may produce olefin terpolymers. In a preferred embodiment of the invention, the ethylene isoprene copolymers produced herein further comprise from 0 to 25 mol % (alternately from 0.5 to 20 mol %, alternately from 1 to 15 mol %, preferably from 3 to 10 mol %) of one or more $C_3$ to $C_{20}$ olefin comonomer (preferably $C_3$ to $C_{12}$ alpha-olefin, preferably propylene, butene, hexene, octene, decene, dodecene, preferably propylene, butene, hexene, octene).

In alternate embodiment, the process of this invention may produce olefin ethylene isoprene copolymers with 0 mol % termonomer.

Typically, the polymers produced herein have an Mn of 5,000 to 250,000 g/mol (preferably 25,000 to 200,000 g/mol, preferably 50,000 to 150,000 g/mol), and/or an Mw/Mn between 1 to 5 (alternately 1.4 to 3, alternately 1.5 to 2.5).

Typically, the polymers produced herein have an Mn of 5,000 to 200,000 g/mol (preferably 25,000 to 150,000 g/mol, preferably 50,000 to 100,000 g/mol), and/or an Mw/Mn of 1 to 5 (alternately 1.1 to 3, alternately 1.3 to 2.5).

In a preferred embodiment of the invention, the polymer produced herein has a unimodal or multimodal molecular weight distribution as determined by Gel Permeation Chromotography (GPC). By "unimodal" is meant that the GPC trace has one peak or inflection point. By "multimodal" is meant that the GPC trace has at least two peaks or inflection points. An inflection point is that point where the second derivative of the curve changes in sign (e.g., from negative to positive or vice versa).

Mw, Mn, and Mw/Mn are determined by using a High Temperature Size Exclusion Chromatograph (Polymer Laboratories), equipped with three in-line detectors, a differential refractive index detector (DRI), a light scattering (LS) detector, and a viscometer. Experimental details, including detector calibration, are described in: T. Sun, P. Brant, R. R. Chance, and W. W. Graessley, Macromolecules, Vol. 34, No. 19, pp. 6812-6820, (2001), and references therein. Three Polymer Laboratories PLgel 10 μm Mixed-B LS columns are used. The nominal flow rate is 0.5 mL/min, and the nominal injection volume is 300 μL. The various transfer lines, columns, viscometer and differential refractometer (the DRI detector) are contained in an oven maintained at 145° C. Solvent for the experiment is prepared by dissolving 6 grams of butylated hydroxytoluene as an antioxidant in 4 liters of Aldrich reagent grade 1, 2, 4 trichlorobenzene (TCB). The TCB mixture is then filtered through a a 0.1 μm Teflon filter. The TCB is then degassed with an online degasser before entering the Size Exclusion Chromatograph. Polymer solutions are prepared by placing dry polymer in a glass container, adding the desired amount of TCB, then heating the mixture at 160° C. with continuous shaking for about 2 hours. All quantities are measured gravimetrically. The TCB densities used to express the polymer concentration in mass/volume units are 1.463 g/ml at room temperature and 1.284 g/ml at 145° C. The injection concentration is from 0.5 to 2.0 mg/ml, with lower concentrations being used for higher molecular weight samples. Prior to running each sample the DRI detector and the injector are purged. Flow rate in the apparatus is then increased to 0.5 ml/minute, and the DRI is allowed to stabilize for 8 to 9 hours before injecting the first sample. The LS laser is turned on at least 1 to 1.5 hours before running the samples. The concentration, c, at each point in the chromatogram is calculated from the baseline-subtracted DRI signal, $I_{DRI}$, using the following equation:

$$c = K_{DRI} I_{DRI}/(dn/dc)$$

where $K_{DRI}$ is a constant determined by calibrating the DRI, and (dn/dc) is the refractive index increment for the system. The refractive index, n=1.500 for TCB at 145° C. and λ=690 nm. For purposes of this invention and the claims thereto the (dn/dc) values are measured with DRI. Units on parameters throughout this description of the SEC method are such that concentration is expressed in g/cm$^3$, molecular weight is expressed in g/mole, and intrinsic viscosity is expressed in dL/g.

The LS detector is a Wyatt Technology High Temperature DAWN HELEOS. The molecular weight, M, at each point in the chromatogram is determined by analyzing the LS output using the Zimm model for static light scattering (M. B. Huglin, LIGHT SCATTERING FROM POLYMER SOLUTIONS, Academic Press, 1971):

$$\frac{K_o c}{\Delta R(\theta)} = \frac{1}{MP(\theta)} + 2A_2 c$$

Here, $\Delta R(\theta)$ is the measured excess Rayleigh scattering intensity at scattering angle θ, c is the polymer concentration determined from the DRI analysis, $A_2$ is the second virial coefficient, for purposes of this invention $A_2$=0.0006, (dn/dc) is measured with DRI, $P(\theta)$ is the form factor for a monodisperse random coil, and $K_o$ is the optical constant for the system:

$$K_o = \frac{4\pi^2 n^2 (dn/dc)^2}{\lambda^4 N_A}$$

where $N_A$ is Avogadro's number, and (dn/dc) is the refractive index increment for the system. The refractive index, n=1.500 for TCB at 145° C. and λ=657 nm.

A high temperature Viscotek Corporation viscometer, which has four capillaries arranged in a Wheatstone bridge configuration with two pressure transducers, is used to determine specific viscosity. One transducer measures the total pressure drop across the detector, and the other, positioned between the two sides of the bridge, measures a differential pressure. The specific viscosity, $\eta_s$, for the solution flowing through the viscometer is calculated from their outputs. The intrinsic viscosity, [η], at each point in the chromatogram is calculated from the following equation:

$$\eta_s = c[\eta] + 0.3(c[\eta])^2$$

where c is concentration and was determined from the DRI output.

The branching index ($g'_{vis}$) is calculated using the output of the SEC-DRI-LS-VIS method as follows. The average intrinsic viscosity, $[\eta]_{avg}$, of the sample is calculated by:

$$[\eta]_{avg} = \frac{\sum c_i [\eta]_i}{\sum c_i}$$

where the summations are over the chromatographic slices, i, between the integration limits.

The branching index $g'_{vis}$ is defined as:

$$g'vis = \frac{[\eta]_{avg}}{kM_v^\alpha}$$

where, for purpose of this invention and claims thereto, $\alpha=0.705$ $k=0.0002288$. $M_v$ is the viscosity-average molecular weight based on molecular weights determined by LS analysis. Z average branching index ($g'Z_{ave}$) is calculated using Ci=polymer concentration in the slice i in the polymer peak times the mass of the slice squared, $Mi^2$.

All molecular weights are weight average unless otherwise noted. All molecular weights are reported in g/mol unless otherwise noted.

In a useful embodiment, the copolymers produced herein have a Tg of 0° C. or less (preferably −20° C. or less, preferably −40° C. or less). Tg is measured by DMTA as follows: Dynamic Mechanical Thermal Analysis (DMTA): A strain controlled rheomether ARES-G2 (TA Instrument) fitted with a liquid $N_2$ cooling accessory and an 8 mm serrated parallel plates assembly was used to measure the thermo-mechanical performance (in torsional mode) of disks of the copolymer. The disks were prepared by molding a plaque of the copolymer in a hot press and subsequently cutting disks from the plaque with a circular hole punch of 8 mm in diameter. Samples were loaded at 100° C. and cooled to −150° C. at a cooling rate of 10° C./min After equilibration, a dynamic temperature sweep experiment was performed using the following conditions: a constant frequency of 1 Hz and strain of 0.1%, and a heating rate of 2° C./min. A constant compression axial force of 0.5 N was applied to avoid normal force development on the rheometer tranducer due to thermal expansion of the plates and the sample. The DMTA measurement gives storage modulus (G', elastic response modulus) and loss modulus (G", viscous response modulus); the ratio of loss to storage moduli at a given temperature is tan δ (tan delta). The tan δ peak is associated with the glass transition (temperature of the brittle-ductile transition).

In a useful embodiment, the copolymers produced herein have a Tm (as measured by DSC) of 100° C. or less (preferably from 0 and 100° C., preferably from 20 and 80° C., preferably from 40 and 60° C.).

In a useful embodiment, the copolymers produced herein have a Tm (as measured by DSC) of 100° C. or less (preferably from 0 and 100° C., preferably from 20 and 80° C., preferably from 40 and 60° C.) and Tg of 0° C. or less (preferably −20° C. or less, preferably −40° C. or less).

In a useful embodiment, the copolymers produced herein have a Tm (as measured by DSC) of 100° C. or less (preferably from 0 and 100° C., preferably from 20 and 80° C., preferably from 40 and 60° C.), and Tg of 0° C. or less (preferably −20° C. or less, preferably −40° C. or less), and an Mn of 5,000 to 250,000 g/mol (preferably 25,000 to 200,000 g/mol, preferably 50,000 to 150,000 g/mol).

In a useful embodiment, the copolymers produced herein have a Tm (as measured by DSC) of 100° C. or less (preferably from 0 and 100° C., preferably from 20 and 80° C., preferably from 40 and 60° C.), and Tg of 0° C. or less (preferably −20° C. or less, preferably −40° C. or less), and an Mn of 5,000 to 250,000 g/mol (preferably 25,000 to 200,000 g/mol, preferably 50,000 to 150,000 g/mol), and an Mw/Mn between 1 to 5 (alternately 1.4 to 3, alternately 1.5 to 2.5).

In an alternate embodiment, the copolymer produced has no Tm as determined by DSC. In a useful embodiment, the copolymers produced herein have 1,4 isoprene isomer present in copolymer at 60% or less of the total of 1,4, 3,4 and 1,2 isoprene isomers present (preferably 20 to 50%, preferably 5 to 30%), as determined by the $^1$H NMR procedure described below.

In a useful embodiment, the copolymers produced herein have a 3,4 and 1,2 isoprene isomers present in copolymer at 40% or more of the total of 1,4, 3,4 and 1,2 isoprene isomers present (preferably 50 to 80%, preferably 70 to 95%), as determined by the $^1$H NMR procedure described below.

1,4 isoprene isomer content, 3,4 isoprene isomer content, and 1,2 isoprene isomer content are determined by $^1$H NMR as follows: polymer composition was determined by $^1$H NMR using a Varian DD2 500 MHz instrument run with a 30° flip angle RF pulse, 120 scans, with a delay of 5 seconds between pulses. The polymer sample was dissolved in heated d2-1,1,2,2-tetrachloroethane and signal collection took place at 120° C. The composition of 1,4-isoprene, 3,4-isoprene, 1,2-isoprene, and ethylene were determined from $^1$H NMR.

| Area | Chemical shift | Intensity of each species |
|---|---|---|
| A | 5.0-5.4 ppm | $I_{1,4}$ |
| B | 4.5-4.9 ppm | $I_{3,4} = (B - 2 * C)/2$ |
| C | 5.8-6.0 ppm | $I_{1,2}$ |
| D | 0-3 ppm | $I_{CH2} = (D - 7 * I_{1,4} - 6 * I_{3,4} - 6 * I_{1,2})/2$ |

Mol % 1,4-isoprene=$I_{1,4}*100/(I_{1,4}+I_{3,4}+I_{1,2}+I_{CH2})$
Mol % 3,4-isoprene=$I_{3,4}*100/(I_{1,4}+I_{3,4}+I_{1,2}+I_{CH2})$
Mol % 1,2-isoprene=$I_{1,2}*100/(I_{1,4}+I_{3,4}+^1_{1,2}+I_{CH2})$
Mol % E=$I_{CH2}*100/(I_{1,4}+I_{3,4}+I_{1,2}+I_{CH2})$ To calculate wt %, the molecular weights of each species were used.

The $^{13}$C solution NMR was performed on a 10 mm broadband probe at a field of at least 400 MHz in d2-1,1,2,2-tetrachloroethane solvent at 120° C. with a flip angle of 90° and full NOE with decoupling. The sample was dissolved in an appropriate amount of solvent.

To determine cis versus trans composition of 1,4-isoprene, $^{13}$C NMR was used. The $CH_3$ units for each species were used to calculate the content in the $^{13}$C NMR: 23.4 ppm for cis-1,4-isoprene, 16.5 ppm for trans-1,4-isoprene, and 18.5 ppm for 3,4-isoprene (no 1,2-isoprene was observed in the $^{13}$C NMR). The mol % isoprene for each unit was determined by taking the area of each $CH_3$ unit and dividing by the total:

mol % cis=$CH_3cis*100/(CH_3cis+CH_3trans+CH_33,4)$
mol % trans=$CH_3trans*100/(CH_3cis+CH_3trans+CH_33,4)$
mol % 3,4=$CH_33,4*100/(CH_3cis+CH_3trans+CH_33,4)$.

To get the total composition, the amount of ethylene (determined from $^1$H NMR) was used. To get the mol % of the total composition, the area of the mol % isoprene from $^{13}$C was multiplied by the total moles of 1,4 and 3,4 from $^1$H NMR, (example: mole cis*.701=mole cis of total). To calculate wt %, the molecular weights of each species were used.

In a useful embodiment, the copolymers produced herein have a Mn of 250,000 g/mol or less; (preferably 30,000 to 250,000 g/mol, preferably 50,000 to 150,000 g/mol), as measured by GPC.

In a useful embodiment, the copolymers produced herein have:
1) from 75 to 90 mol % ethylene (preferably 75 to 85 mol %, preferably 80 to 90 mol %);
2) from 10 to 25 mol % conjugated diene, e.g., isoprene, (preferably 15 to 25 mol %, preferably 10 to 20 mol %);
3) a Tg of 0° C. or less (preferably −20° C. or less, preferably −40° C. or less);
4) 1,4 isoprene isomer is present in copolymer at 60% or less of the total of 1,4, 3,4 and 1,2 isoprene isomers present (preferably 20 to 50%, preferably 5 to 30%);
5) 3,4 and 1,2 isoprene isomers are present in copolymer at 40% or more of the total of 1,4, 3,4 and 1,2 isoprene isomers present (preferably 50 to 80%, preferably 70 to 95%); and
6) Mn of 250,000 g/mol or less; (preferably 30,000 to 250,000 g/mol, preferably 50,000 to 150,000 g/mol).

In a useful embodiment, the copolymers produced herein have:
1) from 75 to 90 mol % ethylene (preferably 75 to 85 mol %, preferably 80 to 90 mol %);
2) from 10 to 25 mol % conjugated diene, e.g., isoprene, (preferably 15 to 25 mol %, preferably 10 to 20 mol %);
3) a Tg of 0° C. or less (preferably −20° C. or less, preferably −40° C. or less);
4) 1,4 isoprene isomer is present in copolymer at 60% or less of the total of 1,4, 3,4 and 1,2 isoprene isomers present (preferably 20 to 50%, preferably 5 to 30%);
5) 3,4 and 1,2 isoprene isomers are present in copolymer at 40% or more of the total of 1,4, 3,4 and 1,2 isoprene isomers present (preferably 50 to 80%, preferably 70 to 95%);
6) Mn of 250,000 g/mol or less; (preferably 30,000 to 250,000 g/mol, preferably 50,000 to 150,000 g/mol); and
7) a Tm of less than 100° C. (preferably from 0 and 100° C., preferably from 20 and 80° C., preferably from 40 and 60° C.).

Blends

In another embodiment, the ethylene isoprene copolymer produced herein is combined with one or more additional polymers prior to being formed into a film, molded part or other article. Useful additional polymers include polyethylene, isotactic polypropylene, highly isotactic polypropylene, syndiotactic polypropylene, random copolymer of propylene and ethylene, and/or butene, and/or hexene, polybutene, ethylene vinyl acetate, LDPE, LLDPE, HDPE, ethylene vinyl acetate, ethylene methyl acrylate, copolymers of acrylic acid, polymethylmethacrylate or any other polymers polymerizable by a high-pressure free radical process, polyvinylchloride, polybutene-1, isotactic polybutene, ABS resins, ethylene-propylene rubber (EPR), vulcanized EPR, EPDM, block copolymer, styrenic block copolymers, polyamides, polycarbonates, PET resins, cross linked polyethylene, copolymers of ethylene and vinyl alcohol (EVOH), polymers of aromatic monomers such as polystyrene, poly-1 esters, polyacetal, polyvinylidene fluoride, polyethylene glycols, polyisoprene, polychloroprene, polybutadiene, styrene-butadiene rubber, and/or polyisobutylene.

In a preferred embodiment of the invention, the copolymer is present in the above blends, at from 10 to 99 wt %, based upon the weight of the polymers in the blend, preferably 20 to 95 wt %, even more preferably at least 30 to 90 wt %, even more preferably at least 40 to 90 wt %, even more preferably at least 50 to 90 wt %, even more preferably at least 60 to 90 wt %, even more preferably at least 70 to 90 wt %.

The blends described above may be produced by mixing the polymers of the invention with one or more polymers (as described above), by connecting reactors together in series to make reactor blends or by using more than one catalyst in the same reactor to produce multiple species of polymer. The polymers can be mixed together prior to being put into the extruder or may be mixed in an extruder.

The blends may be formed using conventional equipment and methods, such as by dry blending the individual components and subsequently melt mixing in a mixer, or by mixing the components together directly in a mixer, such as, for example, a Banbury mixer, a Haake mixer, a Brabender internal mixer, or a single or twin-screw extruder, which may include a compounding extruder and a side-arm extruder used directly downstream of a polymerization process, which may include blending powders or pellets of the resins at the hopper of the film extruder. Additionally, additives may be included in the blend, in one or more components of the blend, and/or in a product formed from the blend, such as a film, as desired. Such additives are well known in the art, and can include, for example: fillers; antioxidants (e.g., hindered phenolics such as IRGANOX™ 1010 or IRGANOX™ 1076 available from Ciba-Geigy); phosphites (e.g., IRGAFOS™ 168 available from Ciba-Geigy); anti-cling additives; tackifiers, such as polybutenes, terpene resins, aliphatic and aromatic hydrocarbon resins, alkali metal and glycerol stearates, and hydrogenated rosins; UV stabilizers; heat stabilizers; anti-blocking agents; release agents; anti-static agents; pigments; colorants; dyes; waxes; silica; fillers; talc; cross-linking agents (such as peroxides) and the like.

Films

Specifically, any of the foregoing polymers, such as the foregoing polypropylenes or blends thereof, may be used in a variety of end-use applications. Such applications include, for example, mono- or multi-layer blown, extruded, and/or cast films or sheets. These films and sheets may be formed by any number of well known extrusion or coextrusion techniques.

The films and sheets may vary in thickness depending on the intended application; however, films and sheets of a thickness from 1 to 1,000 μm are usually suitable. The film or sheet may comprise a sealing layer, which is typically 0.2 to 50 μm on both the inner and outer surfaces of the film or the sealing layer may be present on only the inner or the outer surface.

In another embodiment, one or more layers may be modified by corona treatment, electron beam irradiation, gamma irradiation, flame treatment, or microwave. In a preferred embodiment of the invention, one or both of the surface layers are modified by corona treatment.

In a particularly useful embodiment of the invention, the copolymers produced herein may be blended with other elastomers, such as general purpose rubber, e.g., butyl rubber, styrene-butadiene rubber, butadiene rubber, polyisoprene, halogenated butyl rubber, natural rubber, nitrile rubber, neoprene rubber, silicon rubber, polyurethane elastomers, BIMS, and other rubbers useful in making such automotive tire components as treads and sidewalls.

The blends of copolymer produced herein and elastomer may be used in traditional elastomer applications that include low permeability elastic membranes (such as tire innerliners and protective clothing fabrics); closures for pharmaceutical and food containers; hot melt sealants; molded syringe plunger tips; hoses and gaskets, and molded and extruded automotive components requiring low permeability such as, gaskets, hoses or hose covers.

Depending upon the desired applications, the amount of rubber present in the composition may range from 10 to 90 wt % of the total polymer content of the composition and the copolymer may range from 90 to 10 wt %, based upon the weight of the composition. In most applications and particularly where the rubber component or copolymer is dynamically vulcanized, the rubber component will constitute less than 70 wt %, more preferably less than 50 wt %, and most preferably 10-40 wt % of the total polymer content of the composition.

The blends of copolymer and elastomer may include plasticizers, curatives and may also include reinforcing and non-reinforcing fillers, antioxidants, stabilizers, rubber processing oil, plasticizers, extender oils, lubricants, antiblocking agents, anti-static agents, waxes, foaming agents, pigments, flame retardants and other processing aids known in the rubber compounding art. Such additives can comprise up to 50 wt % of the total composition. Fillers and extenders which can be utilized include conventional inorganics such as calcium carbonate, clays, silica, talc, titanium dioxide, carbon black and the like. The rubber processing oils generally are polybutene, paraffinic, naphthenic or aromatic oils derived from petroleum fractions, but are typically paraffinic oil or polybutenes. The type will be that ordinarily used in conjunction with the specific rubber or rubbers present in the composition, and the quantity based on the total rubber content may range from zero up to 1-200 parts by weight per hundred rubber (phr). Plasticizers such as trimellitate esters may also be present in the composition.

In a useful embodiment, the rubber and or the copolymer are desirably at least partially crosslinked, and preferably are completely or fully cross-linked. The partial or complete crosslinking can be achieved by adding an appropriate rubber curative to the blend and vulcanizing the rubber to the desired degree under conventional vulcanizing conditions.

Further, if a thermoplastic polymer is also combined with the copolymer or the copolymer and the rubber, it is useful if the rubber and or copolymer be crosslinked by the process of dynamic vulcanization. The term "dynamic vulcanization" means a vulcanization or curing process wherein the rubber and or copolymer is vulcanized under conditions of high shear at a temperature above the melting point of the component thermoplastic. The rubber is thus simultaneously crosslinked and dispersed as fine particles within the matrix thermoplastic.

Dynamic vulcanization is effected by contacting or otherwise mixing the thermoplastic elastomer components at elevated temperature in conventional mixing equipment such as roll mills, Banbury mixers, Brabender mixers, continuous mixers, mixing extruders and the like. The unique characteristic of dynamically cured compositions is that, notwithstanding the fact that the rubber component is partially or fully cured, the compositions can be processed and reprocessed by conventional plastic processing techniques such as extrusion, injection molding, blow molding and compression molding. Scrap or flashing can be salvaged and reprocessed.

Those ordinarily skilled in the art will appreciate the appropriate quantities, types of cure systems and vulcanization conditions required to carry out the vulcanization of the copolymer alone or in a blend with a rubber. The material can be vulcanized using varying amounts of curative, varying temperatures and varying time of cure in order to obtain the optimum crosslinking desired. Any known cure system for rubber can be used, so long as it is suitable under the vulcanization conditions with the specific rubber being used and with the thermoplastic component. These curatives include sulfur, sulfur donors, metal oxides, resin systems, peroxide-based systems, hydrosilation curatives, containing platinum or peroxide catalysts, and the like, both with and without accelerators and co-agents. Such cure systems are well known in the art and literature of vulcanization of elastomers. The term "vulcanized" as used in the specification means that the rubber component to be vulcanized has been cured to a state in which the elastomeric properties of the crosslinked rubber are similar to those of the rubber in its conventional vulcanized state, apart from the thermoplastic elastomer composition. The degree of cure can be described in terms of gel content or, conversely, extractable components. Alternatively the degree of cure may be expressed in terms of crosslink density. All of these descriptions are well known in the art, for example in U.S. Pat. Nos. 5,100,947 and 5,157,081.

In another embodiment, this invention relates to:

1. A process to produce copolymers comprising ethylene and conjugated diene comprising: 1) contacting ethylene and conjugated diene with a catalyst system comprising an activator and a catalyst compound represented by the formula:

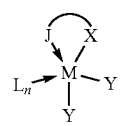

where M is scandium or yttrium;
X is an anionic donor group selected from amido, alkoxide, aryloxide, phosphido, thiolate; J is a neutral Lewis base;
X and J are joined to each other directly or by a bridging group that is one or two atoms in length;
each Y is an anionic leaving group, where the Y groups may be the same or different and two Y groups may be linked to form a dianionic group;
L is a neutral Lewis base;
where L may, or may not, be joined to the (JX) bidentate ligand via a linker group;
n is 0, 1, or 2.

2. The process of paragraph 1, wherein the polymerization temperature is 60° C. or more.

3. The process of paragraph 1 or 2, wherein the conjugated diene is isoprene.

4. The process of paragraph 1, 2, or 3, wherein the copolymer is an ethylene isoprene copolymer.

5. The process of any of paragraphs 1 to 4, wherein the copolymer is an ethylene isoprene copolymer having:
   a) from 75 to 90 mol % ethylene;
   b) from 10 to 25 mol % isoprene;
   c) a Tg of 0° C. or less;
   d) 1,4 isoprene isomer present at 60% or less of the total of 1,4, 3,4 and 1,2 isoprene isomers present;
   e) 3,4 and 1,2 isoprene isomers present at 40% or more of the total of 1,4, 3,4 and 1,2 isoprene isomers present;
   f) an Mn of 250,000 g/mol or less; and
   g) optionally, a Tm of 100° C. or less.

6. The process of any of paragraphs 1 to 5, wherein M is scandium.
7. The process of any of paragraphs 1 to 6, wherein X is amido or arylamido.
8. The process of any of paragraphs 1 to 7, wherein J is substituted pyridine.
9. The process of any of paragraphs 1 to 8, wherein Y is methyl, alkylsilane, or CH$_2$SiMe$_3$.
10. The process of any of paragraphs 1 to 9, wherein L is ether or tetrahydrofuran.
11. The process of any of paragraphs 1 to 10, wherein n is 1.
12. The process of claim 1, wherein the catalyst is represented by the formula:

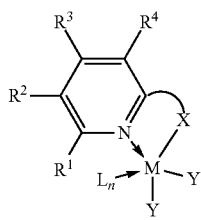

where M, X, Y, L, and n are as defined in paragraph 1;
X is joined to the pyridine group by a linker group that is one or two atoms in length;
R$^1$ is selected from hydrogen, alkyl, substituted alkyl, aryl, or substituted aryl;
R$^2$, R$^3$, and R$^4$ are selected from hydrogen, alkyl, aryl, halogen, amino, alkoxy, and silyl;
where L may, or may not, be joined to R$^1$ via a linker group.
13. The process of paragraph 1, wherein the catalyst compound is represented by the formula:

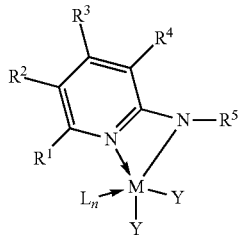

where M, Y, L, and n are as defined in paragraph 1;
R$^1$ is selected from hydrogen, alkyl, substituted alkyl, aryl, or substituted phenyl;
R$^2$, R$^3$, and R$^4$ are selected from hydrogen, alkyl, aryl, halogen, amino, alkoxy, and silyl;
where L may, or may not, be joined to R$^1$ via a linker group; and
R$^5$ is selected from, alkyl, substituted alkyl, aryl, or substituted aryl.
14. The process of any of paragraphs 1 to 13, wherein R$^1$ and R$^5$ are independently selected from 2,6-dimethylphenyl, 2,4,6-trimethylphenyl, 2,6-diethylphenyl, 2,4,6-triethylphenyl, 2,6-diisopropylphenyl, 2,4,6-triisopropylphenyl, 2,4-di(t-butyl)phenyl, 2-t-butylphenyl, 2-ethylphenyl, 2-isopropylphenyl, and 2-ethyl-6-methylphenyl.
15. The process of any of paragraphs 1 to 14, wherein the activator comprises a non-coordinating anion activator.

16. The process of any of paragraphs 1 to 15, wherein the activator is represented by the formula:

$$(Z)_d^+(A^{d-})$$

wherein Z is (L-H) or a reducible Lewis Acid, L is a neutral Lewis base; H is hydrogen; (L-H)$^+$ is a Brønsted acid; A$^{d-}$ is a non-coordinating anion having the charge d−; and d is an integer from 1 to 3.

17. The process of any of paragraphs 1 to 15, wherein the activator is represented by the formula:

$$(Z)_d^+(A^{d-})$$

wherein A$^{d-}$ is a non-coordinating anion having the charge d−; d is an integer from 1 to 3, and Z is a reducible Lewis acid represented by the formula: (Ar$_3$C$^+$), where Ar is aryl or aryl substituted with a heteroatom, a C$_1$ to C$_{40}$ hydrocarbyl, or a substituted C$_1$ to C$_{40}$ hydrocarbyl.

18. The process of any of paragraphs 1 to 17, wherein the process occurs at a temperature of from about 60° C. to about 300° C., at a pressure in the range of from about 0.35 MPa to about 10 MPa, and at a time up to 300 minutes.

Experimental

Abbreviations used herein include: Complex 1 ((CH$_2$SiMe$_3$)$_2$(thf)Sc(2,4,6-trimethylphenyl)-[6-(2,4,6-triisopropylphenyl)-pyridin-2-ylamido;) was produced by reaction of in situ generated Sc(CH$_2$SiMe$_3$)$_3$(thf)$_2$ with N-mesityl-6-(2,4,6-triisopropylphenyl)pyridin-2-amine. This complex was similarly prepared in the European Journal of Inorganic Chemistry 2009, pp. 4255-4264, and is represented by the formula:

complex 1

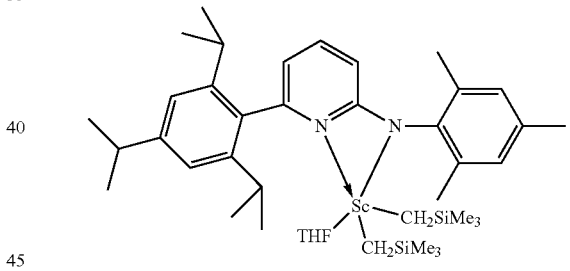

Activator 1 is N,N-dimethylanilinium tetrakis(pentafluorophenyl)borate.

High-Throughput Polymerization using Complex 1.

Ethylene homopolymerizations, isoprene homopolymerizations, and ethylene/isoprene copolymerizations were carried out in a parallel, pressure reactor, as generally described in U.S. Pat. Nos. 6,306,658; 6,455,316; 6,489,168; WO 00/09255; and Murphy et al., J. Am. Chem. Soc., 2003, 125, pp. 4306-4317, each of which is fully incorporated herein by reference to the extent not inconsistent with this specification. A pre-weighed glass vial insert and disposable stirring paddle were fitted to each reaction vessel of the reactor, which contains 48 individual reaction vessels. The reactor was then closed and each vessel was individually heated to the desired process temperature and pressurized to the desired process pressure with ethylene. Optionally, comonomer (e.g., isoprene) was then injected into each reaction vessel through a valve, followed by enough solvent to bring the total reaction volume, including the subsequent additions, to 5 mL. A solution of tri(isobutyl)aluminum in toluene (typically 0.05 to 0.1 mL) was then added. The contents of the vessel were then stirred at 800 rpm. An activator solution of N,N-dimethylanilinium tetrakis (pentafluorophenylborate), 1.0 molar equivalent relative to the transition metal complex to be added, in toluene (typically 0.1 mL) was then injected into the reaction vessel along with a solvent chaser (typically 0.5 mL). Then a toluene solution of catalyst 1 (typically 200 nanomols) in toluene (typically 0.1 mL) was added along with and a solvent chaser (typically 0.5 mL).

The reaction was then allowed to proceed either for a set amount of time or until a desired amount of pressure uptake had occurred (typically 15 psi or 0.103 MPa). During polymerizations involving ethylene, the ethylene pressure was maintained in each reaction vessel at the pre-set level by computer control. The reaction was quenched by pressurizing the vessel with compressed air to 100 psi over the reactor pressure. After the polymerization reaction, the pressure was vented and, optionally, a 1:1 mixture of Irganox 1076 and Irgafos 168 (25 mg total) dissolved in toluene (0.1 mL) was added to the solution of the glass vial containing the polymer solution. Then the glass vial insert containing the polymer product and solvent was removed from the pressure cell and the inert atmosphere glove box, and the volatile components were removed using a Genevac HT-12 centrifuge and Genevac VC3000D vacuum evaporator operating at elevated temperature and reduced pressure. The vial was then weighed to determine the yield of the polymer product. The resultant polymer was analyzed by Rapid GPC (see below).

To determine various molecular weight related values by GPC, high temperature size exclusion chromatography was performed using an automated "Rapid GPC" system as generally described in U.S. Pat. Nos. 6,491,816; 6,491,823; 6,475,391; 6,461,515; 6,436,292; 6,406,632; 6,175,409; 6,454,947; 6,260,407; and 6,294,388. This apparatus has a series of three 30 cm×7.5 mm linear columns, each containing PLgel 10 um, Mix B. The GPC system was calibrated using polystyrene standards ranging from 580 g/mol to 3,390,000 g/mol. The system was operated at an eluent flow rate of 2.0 mL/min and an oven temperature of 165° C. 1,2,4-trichlorobenzene was used as the eluent. The polymer samples were dissolved in 1,2,4-trichlorobenzene at a concentration of 0.1 to 0.9 mg/mL. 250 µL of a polymer solution was injected into the system. The concentration of the polymer in the eluent was monitored using an evaporative light scattering detector. The molecular weights presented in the examples are relative to linear polystyrene standards.

Differential Scanning calorimetry (DSC) measurements were performed on a TA-Q100 instrument to determine the melting point of the polymers. Samples were pre-annealed at 220° C. for 15 minutes and then allowed to cool to room temperature overnight. The samples were then heated to 220° C. at a rate of 100° C./minute and then cooled at a rate of 50° C./min. Melting points were collected during the heating period.

Shown in Tables 1 and 2 are polymerization conditions and characterization data for the homopolymerization of ethylene, homopolymerization of isoprene (IP), and the copolymerization of ethylene and isoprene by Complex 1 with N,N-dimethylanilinium tetrakis(pentafluorophenyl)borate activator.

Shown in FIG. 1 is dynamical mechanical thermal analysis (DMTA) data for the ethylene-isoprene copolymer produced in example 24. The data show a single glass transition at −43° C. for the loss modulus peak (or −36° C. for the tan delta peak) which is consistent with a random ethylene-isoprene copolymer. Furthermore, this sample does not display a melt transition that would indicate the presecne of homopolyethylene.

TABLE 1

Polymerizations (polym temp 80° C.)

| Example | type | ethylene (psi) | isoprene (mL) | complex 1 (mmol) | TIBAL (nmol) | time (sec) | yield (mg) |
|---|---|---|---|---|---|---|---|
| 1 | PI | 0 | 0.1 | 0.0002 | 500 | 1201 | 42 |
| 2 | PI | 0 | 0.1 | 0.0002 | 500 | 1201 | 42 |
| 3 | PI | 0 | 0.1 | 0.0002 | 1000 | 1201 | 51 |
| 4 | PI | 0 | 0.1 | 0.0002 | 1000 | 1201 | 51 |
| 5 | PI | 0 | 0.1 | 0.0002 | 2000 | 1202 | 53 |
| 6 | PI | 0 | 0.1 | 0.0002 | 2000 | 1201 | 51 |
| 7 | PI | 0 | 0.1 | 0.0002 | 2000 | 1201 | 53 |
| 8 | PI | 0 | 0.1 | 0.0002 | 2000 | 1200 | 47 |
| 9 | PE | 100 | 0.0 | 0.0002 | 500 | 52 | 32 |
| 10 | PE | 100 | 0.0 | 0.0002 | 500 | 52 | 32 |
| 11 | PE | 100 | 0.0 | 0.0002 | 1000 | 45 | 28 |
| 12 | PE | 100 | 0.0 | 0.0002 | 1000 | 48 | 36 |
| 13 | PE | 100 | 0.0 | 0.0002 | 2000 | 43 | 33 |
| 14 | PE | 100 | 0.0 | 0.0002 | 2000 | 47 | 36 |
| 15 | PE | 100 | 0.0 | 0.0002 | 2000 | 49 | 37 |
| 16 | PE | 100 | 0.0 | 0.0002 | 2000 | 52 | 35 |
| 17 | E/IP | 100 | 0.1 | 0.0002 | 500 | 188 | 46 |
| 18 | E/IP | 100 | 0.1 | 0.0002 | 500 | 203 | 43 |
| 19 | E/IP | 100 | 0.1 | 0.0002 | 1000 | 183 | 47 |
| 20 | E/IP | 100 | 0.1 | 0.0002 | 1000 | 178 | 47 |
| 21 | E/IP | 100 | 0.1 | 0.0002 | 2000 | 149 | 47 |
| 22 | E/IP | 100 | 0.1 | 0.0002 | 2000 | 154 | 50 |
| 23 | E/IP | 100 | 0.1 | 0.0002 | 2000 | 165 | 49 |
| 24* | E/IP | | | | | | 1271 |

All polymerizations were performed using isohexane solvent, total volume = 5 mL.
*Example 24 is combined polymer from twenty-five individual vials performed under conditions that were identical to those used for runs 21-23. The total yield from the combined vials was 1.27 grams, isoprene content ($^1$H NMR) was 13.1 mol %, isomer ratio(by 1HNMR) was (1,4-isoprene:1,2-isoprene:3,4-isoprene) 51:0:49, and Tg was −36° C.

TABLE 2

Characterization Data for Polymers

| Ex | type | Mw (g/mol) | Mn (g/mol) | Mw/Mn | Tm (° C.) |
|---|---|---|---|---|---|
| 1 | PI | 276,204 | 182,586 | 1.5 | |
| 2 | PI | 234,621 | 151,609 | 1.5 | |
| 3 | PI | 206,129 | 144,767 | 1.4 | |
| 4 | PI | 219,340 | 129,369 | 1.7 | |
| 5 | PI | 165,526 | 91,754 | 1.8 | |
| 6 | PI | 149,794 | 86,368 | 1.7 | |
| 7 | PI | 177,075 | 100,636 | 1.8 | |
| 9 | PE | 92,679 | 58,291 | 1.6 | 135 |
| 10 | PE | 87,182 | 51,741 | 1.7 | 135 |
| 11 | PE | 55,567 | 34,031 | 1.6 | 134 |
| 12 | PE | 59,348 | 37,920 | 1.6 | 134 |
| 13 | PE | 27,568 | 18,161 | 1.5 | 132 |
| 14 | PE | 28,139 | 19,590 | 1.4 | 132 |
| 15 | PE | 30,147 | 21,384 | 1.4 | 132 |
| 17 | E/IP | 107,297 | 65,664 | 1.6 | 55 |
| 18 | E/IP | 115,761 | 78,106 | 1.5 | 57 |
| 19 | E/IP | 77,245 | 52,618 | 1.5 | 53 |
| 20 | E/IP | 78,975 | 51,367 | 1.5 | 54 |
| 21 | E/IP | 47,904 | 29,577 | 1.6 | 55 |
| 22 | E/IP | 47,977 | 28,660 | 1.7 | 56 |
| 23 | E/IP | 46,669 | 30,795 | 1.5 | 55 |

All documents described herein are incorporated by reference herein, including any priority documents and/or testing procedures to the extent they are not inconsistent with this text. As is apparent from the foregoing general description and the specific embodiments, while forms of the invention have been illustrated and described, various modifications can be made without departing from the spirit and scope of the invention. Accordingly, it is not intended that the invention be limited thereby. The term "comprising" is considered synonymous with the term "including". Likewise, whenever a composition, an element or a group of elements is preceded with the transitional phrase "comprising", it is understood that we also contemplate the same composition or group of elements with transitional phrases "consisting essentially of," "consisting of," "selected from the group of consisting of," or "is" preceding the recitation of the composition, element, or elements and vice versa.

The invention claimed is:

1. A process to produce copolymers comprising ethylene and conjugated diene comprising: 1) contacting ethylene and conjugated diene with a catalyst system comprising an activator and a catalyst compound represented by the formula:

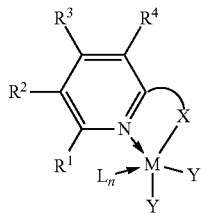

where M is scandium or yttrium;
R¹ is selected from hydrogen, alkyl, substituted alkyl, aryl, or substituted aryl;
R², R³, and R⁴ are selected from hydrogen, alkyl, aryl, halogen, amino, alkoxy, and silyl;
X is an anionic donor group selected from amido, alkoxide, aryloxide, phosphido, thiolate and X is joined to the pyridine group directly or by a linker group that is one or two atoms in length;
each Y is an anionic leaving group, where the Y groups may be the same or different and two Y groups may be linked to form a dianionic group;
L is a neutral Lewis base;
where L may, or may not, be joined to R¹ via a linker group; and
n is 0, 1, or 2.

2. The process of claim 1, wherein the polymerization temperature is 60° C. or more.

3. The process of claim 1, wherein the conjugated diene is isoprene.

4. The process of claim 1, wherein the copolymer is an ethylene isoprene copolymer.

5. The process of claim 1, wherein the copolymer is an ethylene isoprene copolymer having:
a) from 75 to 90 mol % ethylene;
b) from 10 to 25 mol % isoprene;
c) a Tg of 0° C. or less;
d) 1,4 isoprene isomer present at 60% or less of the total of 1,4, 3,4 and 1,2 isoprene isomers present;
e) 3,4 and 1,2 isoprene isomers present at 40% or more of the total of 1,4, 3,4 and 1,2 isoprene isomers present; and
f) an Mn of 250,000 g/mol or less.

6. A process to produce copolymers comprising ethylene and conjugated diene comprising: 1) contacting ethylene and conjugated diene with a catalyst system comprising an activator and a catalyst compound where the catalyst is $(CH_2SiMe_3)_2$(thf)Sc(2,4,6-trimethylphenyl)-[6-(2,4,6-triisopropylphenyl)-pyridin-2-ylamido].

7. The process of claim 1, wherein X is amido or arylamido.

8. A process to produce copolymers comprising ethylene and conjugated diene comprising: 1) contacting ethylene and conjugated diene with a catalyst system comprising an activator and a catalyst represented by formula:

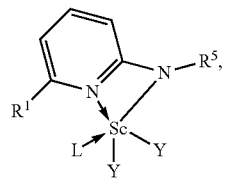

where:
R¹=2,4,6-triisopropylphenyl, R⁵=2,4,6-trimethylphenyl, L=THF, Y=CH₂SiMe₃;
R¹=2,4,6-triisopropylphenyl, R⁵=2,4,6-trimethylphenyl, L=THF, Y=Me;
R¹=2,4,6-triisopropylphenyl, R⁵=2,4,6-trimethylphenyl, L=THF, Y=CH₂SiPhMe₂;
R¹=2,6-diisopropylphenyl, R⁵=2,4,6-trimethylphenyl, L=THF, Y=CH₂SiMe₃;
R¹=2,6-diisopropylphenyl, R⁵=2,4,6-trimethylphenyl, L=THF, Y=Me;
R¹=2,6-diisopropylphenyl, R⁵=2,4,6-trimethylphenyl, L=THF, Y=CH₂SiPhMe₂;
R¹=2,4,6-triisopropylphenyl, R⁵=2,6-dimethylphenyl, L=THF, Y=CH₂SiMe₃;
R¹=2,4,6-triisopropylphenyl, R⁵=2,6-dimethylphenyl, L=THF, Y=Me;
R¹=2,4,6-triisopropylphenyl, R⁵=2,6-dimethylphenyl, L=THF, Y=CH₂SiPhMe₂;
R¹=2,4,6-triisopropylphenyl, R⁵=2,4,6-trimethylphenyl, L=2-methyltetrahydrofuran, Y=CH₂SiMe₃;
R¹=2,4,6-triisopropylphenyl, R⁵=2,4,6-trimethylphenyl, L=2-methyltetrahydrofuran, Y=Me;
R¹=2,4,6-triisopropylphenyl, R⁵=2,4,6-trimethylphenyl, L=2-methyltetrahydrofuran, Y=CH₂SiPhMe₂;
R¹=2,6-diisopropylphenyl, R⁵=2,4,6-trimethylphenyl, L=2-methyltetrahydrofuran, Y=CH₂SiMe₃;
R¹=2,6-diisopropylphenyl, R⁵=2,4,6-trimethylphenyl, L=2-methyltetrahydrofuran, Y=Me;
R¹=2,6-diisopropylphenyl, R⁵=2,4,6-trimethylphenyl, L=2-methyltetrahydrofuran, Y=CH₂SiPhMe₂;
R¹=2,4,6-triisopropylphenyl, R⁵=2,6-dimethylphenyl, L=2-methyltetrahydrofuran, Y=CH₂SiMe₃;
R¹=2,4,6-triisopropylphenyl, R⁵=2,6-dimethylphenyl, L=2-methyltetrahydrofuran, Y=Me; or
R¹=2,4,6-triisopropylphenyl, R⁵=2,6-dimethylphenyl, L=2-methyltetrahydrofuran, Y=CH₂SiPhMe₂.

9. The process of claim 1, wherein Y is methyl, alkylsilane, or CH₂SiMe₃.

10. The process of claim 1, wherein L is ether or tetrahydrofuran.

11. The process of claim 1, wherein n is 1.

12. A process to produce copolymers comprising ethylene and conjugated diene comprising: 1) contacting ethylene and conjugated diene with a catalyst system comprising an activator and a catalyst compound represented by the formula:

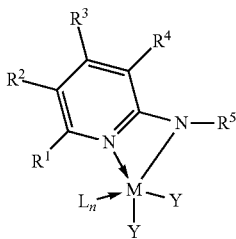

wherein
M is scandium or yttrium;
each Y is an anionic leaving group, where the Y groups may be the same or different and two Y groups may be linked to form a dianionic group;
L is a neutral Lewis base;
n is 0, 1, or 2;
$R^2$, $R^3$, and $R^4$ are selected from hydrogen, alkyl, aryl, halogen, amino, alkoxy, and silyl;
where L may, or may not, be joined to $R^1$ via a linker group;
$R^1$ is selected from hydrogen, $C_1$ to $C_{30}$ alkyl, $C_1$ to $C_{30}$ substituted alkyl, Ci to $C_{30}$ aryl, $C_1$ to $C_{30}$ substituted phenyl; and
$R^5$ is selected from hydrogen, $C_1$ to $C_{30}$ alkyl, $C_1$ to $C_{30}$ substituted alkyl, $C_1$ to $C_{30}$ aryl, $C_1$ to $C_{30}$ substituted aryl.

13. A process to produce copolymers comprising ethylene and conjugated diene comprising: 1) contacting ethylene and conjugated diene with a catalyst system comprising an activator and a catalyst compound represented by the formula:

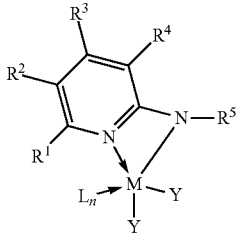

where;
M is scandium or yttrium;
each Y is an anionic leaving group, where the Y groups may be the same or different and two Y groups may be linked to form a dianionic group;
L is a neutral Lewis base;
n is 0, 1, or 2;
$R^1$ is selected from hydrogen, alkyl, substituted alkyl, aryl, or substituted phenyl;
$R^2$, $R^3$, and $R^4$ are selected from hydrogen, alkyl, aryl, halogen, amino, alkoxy, and silyl;
where L may, or may not, be joined to $R^1$ via a linker group; and
$R^5$ is selected from, alkyl, substituted alkyl, aryl, or substituted aryl.

14. The process of claim 12, wherein $R^1$ and $R^5$ are independently selected from 2,6-dimethylphenyl, 2,4,6-trimethylphenyl, 2,6-diethylphenyl, 2,4,6-triethylphenyl, 2,6-diisopropylphenyl, 2,4,6-triisopropylphenyl, 2,4-di(t-butyl)phenyl, 2-t-butylphenyl, 2-ethylphenyl, 2-isopropylphenyl, and 2-ethyl-6-methylphenyl.

15. The process of claim 1, wherein the activator comprises a non-coordinating anion activator.

16. The process of claim 1, wherein activator is represented by the formula:

$$(Z)_d^+(A^{d-})$$

wherein Z is (L-H) or a reducible Lewis Acid, L is a neutral Lewis base; H is hydrogen; (L-H)$^+$ is a Bronsted acid; $A^{d-}$ is a non-coordinating anion having the charge d−; and d is an integer from 1 to 3.

17. The process of claim 1, wherein the activator is represented by the formula:

$$(Z)_d^+(A^{d-})$$

wherein $A^{d-}$ is a non-coordinating anion having the charge d−; d is an integer from 1 to 3, and Z is a reducible Lewis acid represented by the formula: $(Ar_3C^+)$, where Ar is aryl or aryl substituted with a heteroatom, a $C_1$ to $C_{40}$ hydrocarbyl, or a substituted $C_1$ to $C_{40}$ hydrocarbyl.

18. The process of claim 1, wherein the activator is one or more of:
N,N-dimethylanilinium tetrakis(pentafluorophenyl)borate,
triphenylcarbenium tetrakis(pentafluorophenyl)borate,
trimethylammonium tetrakis(perfluoronaphthyl)borate,
triethylammonium tetrakis(perfluoronaphthyl)borate,
tripropylammonium tetrakis(perfluoronaphthyl)borate,
tri(n-butyl)ammonium tetrakis(perfluoronaphthyl)borate,
tri(t-butyl)ammonium tetrakis(perfluoronaphthyl)borate,
N,N-dimethylanilinium tetrakis(perfluoronaphthyl)borate,
N,N-diethylanilinium tetrakis(perfluoronaphthyl)borate,
N,N-dimethyl-(2,4,6-trimethylanilinium) tetrakis(perfluoronaphthyl)borate,
tropillium tetrakis(perfluoronaphthyl)borate,
triphenylcarbenium tetrakis(perfluoronaphthyl)borate,
triphenylphosphonium tetrakis(perfluoronaphthyl)borate,
triethylsilylium tetrakis(perfluoronaphthyl)borate,
benzene(diazonium) tetrakis(perfluoronaphthyl)borate,
trimethylammonium tetrakis(perfluorobiphenyl)borate,
triethylammonium tetrakis(perfluorobiphenyl)borate,
tripropylammonium tetrakis(perfluorobiphenyl)borate,
tri(n-butyl)ammonium tetrakis(perfluorobiphenyl)borate,
tri(t-butyl)ammonium tetrakis(perfluorobiphenyl)borate,
N,N-dimethylanilinium tetrakis(perfluorobiphenyl)borate,
N,N-diethylanilinium tetrakis(perfluorobiphenyl)borate,
N,N-dimethyl-(2,4,6-trimethylanilinium) tetrakis(perfluorobiphenyl)borate,
tropillium tetrakis(perfluorobiphenyl)borate,
triphenylcarbenium tetrakis(perfluorobiphenyl)borate,
triphenylphosphonium tetrakis(perfluorobiphenyl)borate,
triethylsilylium tetrakis(perfluorobiphenyl)borate,
benzene(diazonium) tetrakis(perfluorobiphenyl)borate,
[4-t-butyl-PhNMe$_2$H][(C$_6$F$_3$(C$_6$F$_5$)$_2$)$_4$B],
trimethylammonium tetraphenylborate,
triethylammonium tetraphenylborate,
tripropylammonium tetraphenylborate,
tri(n-butyl)ammonium tetraphenylborate,
tri(t-butyl)ammonium tetraphenylborate,
N,N-dimethylanilinium tetraphenylborate,
N,N-diethylanilinium tetraphenylborate,
N,N-dimethyl-(2,4,6-trimethylanilinium) tetraphenylborate,
tropillium tetraphenylborate,
triphenylcarbenium tetraphenylborate,
triphenylphosphonium tetraphenylborate, triethylsilylium tetraphenylborate,
benzene(diazonium)tetraphenylborate,
trimethylammonium tetrakis(pentafluorophenyl)borate,
triethylammonium tetrakis(pentafluorophenyl)borate,
tripropylammonium tetrakis(pentafluorophenyl)borate,
tri(n-butyl)ammonium tetrakis(pentafluorophenyl)borate,
tri(sec-butyl)ammonium tetrakis(pentafluorophenyl)borate,
N,N-dimethylanilinium tetrakis(pentafluorophenyl)borate,
N,N-diethylanilinium tetrakis(pentafluorophenyl)borate,
N,N-dimethyl-(2,4,6-trimethylanilinium) tetrakis(pentafluorophenyl)borate,
tropillium tetrakis(pentafluorophenyl)borate,
triphenylcarbenium tetrakis(pentafluorophenyl)borate,
triphenylphosphonium tetrakis(pentafluorophenyl)borate,
triethylsilylium tetrakis(pentafluorophenyl)borate,
benzene(diazonium) tetrakis(pentafluorophenyl)borate,
trimethylammonium tetrakis-(2,3,4,6-tetrafluorophenyl)borate,
triethylammonium tetrakis-(2,3,4,6-tetrafluorophenyl)borate,
tripropylammonium tetrakis-(2,3,4,6-tetrafluorophenyl)borate,
tri(n-butyl)ammonium tetrakis-(2,3,4,6-tetrafluoro-phenyl)borate,
dimethyl(t-butyl)ammonium tetrakis-(2,3,4,6-tetrafluorophenyl)borate,
N,N-dimethylanilinium tetrakis-(2,3,4,6-tetrafluorophenyl)borate,
N,N-diethylanilinium tetrakis-(2,3,4,6-tetrafluorophenyl)borate,
N,N-dimethyl-(2,4,6-trimethylanilinium) tetrakis-(2,3,4,6-tetrafluorophenyl)borate,
tropillium tetrakis-(2,3,4,6-tetrafluorophenyl)borate,
triphenylcarbenium tetrakis-(2,3,4,6-tetrafluorophenyl)borate,
triphenylphosphonium tetrakis-(2,3,4,6-tetrafluorophenyl)borate,
triethylsilylium tetrakis-(2,3,4,6-tetrafluorophenyl)borate,
benzene(diazonium) tetrakis-(2,3,4,6-tetrafluorophenyl)borate,
trimethylammonium tetrakis(3,5-bis(trifluoromethyl)phenyl)borate,
triethylammonium tetrakis(3,5-bis(trifluoromethyl)phenyl)borate,
tripropylammonium tetrakis(3,5-bis(trifluoromethyl)phenyl)borate,
tri(n-butyl)ammonium tetrakis(3,5-bis(trifluoromethyl) phenyl)borate,
tri(t-butyl)ammonium tetrakis(3,5-bis(trifluoromethyl) phenyl)borate,
N,N-dimethylanilinium tetrakis(3,5-bis(trifluoromethyl) phenyl)borate,
N,N-diethylanilinium tetrakis(3,5-bis(trifluoromethyl) phenyl)borate,
N,N-dimethyl-(2,4,6-trimethylanilinium) tetrakis(3,5-bis (trifluoromethyl)phenyl)borate,
tropillium tetrakis(3,5-bis(trifluoromethyl)phenyl)borate,
triphenylcarbenium tetrakis(3,5-bis(trifluoromethyl)phenyl)borate,
triphenylphosphonium tetrakis(3,5-bis(trifluoromethyl) phenyl)borate,
triethylsilylium tetrakis(3,5-bis(trifluoromethyl)phenyl)borate,
benzene(diazonium) tetrakis(3,5-bis(trifluoromethyl)phenyl)borate,
di-(i-propyl)ammonium tetrakis(pentafluorophenyl)borate,
dicyclohexylammonium tetrakis(pentafluorophenyl)borate,
tri(o-tolyl)phosphonium tetrakis(pentafluorophenyl)borate,
tri(2,6-dimethylphenyl)phosphonium tetrakis(pentafluorophenyl)borate,
triphenylcarbenium tetrakis(perfluorophenyl)borate,
1-(4-(tris(pentafluorophenyl)borate)-2,3,5,6-tetrafluorophenyl)pyrrolidinium,
tetrakis(pentafluorophenyl)borate,
4-(tris(pentafluorophenyl)borate)-2,3,5,6-tetrafluoropyridine, and
triphenylcarbenium tetrakis(3,5-bis(trifluoromethyl)phenyl)borate).

19. The process of claim 1, wherein the process occurs at a temperature of from about 60° C. to about 300° C., at a pressure in the range of from about 0.35 MPa to about 10 MPa, and at a time up to 300 minutes.

20. The process of claim 5 wherein the copolymer has a Tm of 100° C. or less.

21. The process of claim 1, further comprising: 2) obtain a copolymer of ethylene and isoprene having:
 1) from 75 to 90 mol % ethylene;
 2) from 10 to 25 mol % isoprene;
 3) a Tg of 0° C. or less;
 4) 1,4 isoprene isomer present at 60% or less of the total of 1,4, 3,4 and 1,2 isoprene isomers present;
 5) 3,4 and 1,2 isoprene isomers present at 40% or more of the total of 1,4, 3,4 and 1,2 isoprene isomers present; and
 6) Mn of 250,000 g/mol or less.

22. A process to produce copolymers comprising ethylene and conjugated diene comprising: 1) contacting ethylene and conjugated diene with a catalyst system comprising an activator and a catalyst compound represented by the formula:

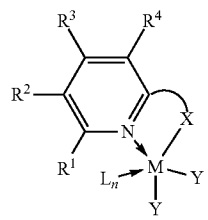

where M is scandium;
$R^1$ is selected from hydrogen, alkyl, substituted alkyl, aryl, or substituted aryl;
$R^2$, $R^3$, and $R^4$ are selected from hydrogen, alkyl, aryl, halogen, amino, alkoxy, and silyl;
X is an anionic donor group selected from amido, alkoxide, aryloxide, phosphido, thiolate and X is joined to the pyridine group by a linker group that is one or two atoms in length;
each Y is an anionic leaving group, where the Y groups may be the same or different and two Y groups may be linked to form a dianionic group;
L is a neutral Lewis base, where L may, or may not, be joined to $R^1$ via a linker group; and
n is 0, 1, or 2.

23. The process of claim 22, further comprising: 2) obtaining a copolymer of ethylene and isoprene having:
1) from 75 to 90 mol % ethylene;
2) from 10 to 25 mol % isoprene;
3) a Tg of 0° C. or less;
4) 1,4 isoprene isomer present at 60% or less of the total of 1,4, 3,4 and 1,2 isoprene isomers present;
5) 3,4 and 1,2 isoprene isomers present at 40% or more of the total of 1,4, 3,4 and 1,2 isoprene isomers present; and
6) Mn of 250,000 g/mol or less.

* * * * *